US012756426B2

(12) United States Patent
Li et al.

(10) Patent No.: US 12,756,426 B2
(45) Date of Patent: Oct. 6, 2026

(54) WIRELESS SECURE COMMUNICATION METHOD USING RECONFIGURABLE INTELLIGENT SURFACE-NON-ORTHOGONAL MULTIPLE ACCESS UNDER COMPLEX CHANNEL CONDITIONS

(71) Applicant: Taiyuan University of Science and Technology, Taiyuan (CN)

(72) Inventors: Meiling Li, Taiyuan (CN); Ruifen Ma, Taiyuan (CN); Zhaoming Lu, Taiyuan (CN); Heyong Han, Taiyuan (CN); Chang Liu, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 288 days.

(21) Appl. No.: 18/610,234

(22) Filed: Mar. 19, 2024

(65) Prior Publication Data

US 2024/0405805 A1 Dec. 5, 2024

(30) Foreign Application Priority Data

Apr. 25, 2023 (CN) ........................ 202310455947.0

(51) Int. Cl.

| | |
|---|---|
| ***H04L 5/00*** | (2006.01) |
| ***H04B 7/04*** | (2017.01) |
| ***H04B 17/336*** | (2015.01) |

(52) U.S. Cl.
CPC ....... *H04B 7/04013* (2023.05); *H04B 17/336* (2015.01); *H04L 5/0005* (2013.01)

(58) Field of Classification Search
None
See application file for complete search history.

(56) References Cited

PUBLICATIONS ("Impact of Residual Hardware Impairment on the IoT Secrecy Performance of RIS-Assisted NOMA Networks", 2021).*
("Cascaded k-m Fading Channels with Colluding and Non-Colluding Eavesdroppers: Physical-Layer Security Analysis" 2021).*

* cited by examiner

*Primary Examiner* — Abdelillah Elmejjarmi
(74) *Attorney, Agent, or Firm* — MATTHIAS SCHOLL P.C.; Matthias Scholl

(57) ABSTRACT

A wireless secure communication method based on RIS-NOMA under complex channel conditions, the method including: firstly, an intelligent surface is assume to be disposed between the base station and legitimate NOMA users, and between the base station and eavesdroppers; the signal to interference plus distortion noise ratio (SIDNR) for the legitimate NOMA user and the eavesdropper is calculated in the presence of RHI in the system; secondly, considering shadow fading and to simplify the overly complex calculation process, the probability density function and cumulative distribution function of the shadow fading are approximated; finally, the outage probability and intercept probability of the legitimate users and eavesdroppers are calculated.

5 Claims, 12 Drawing Sheets

WIRELESS SECURE COMMUNICATION METHOD USING RECONFIGURABLE INTELLIGENT SURFACE-NON-ORTHOGONAL MULTIPLE ACCESS UNDER COMPLEX CHANNEL CONDITIONS

CROSS-REFERENCE TO RELATED APPLICATIONS

Pursuant to 35 U.S.C. § 119 and the Paris Convention Treaty, this application claims foreign priority to Chinese Patent Application No. 202310455947.0 filed Apr. 25, 2023, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of wireless communication, and more particularly to a wireless secure communication method using reconfigurable intelligent surface-non-orthogonal multiple access (RIS-NOMA) under complex channel conditions.

Reconfigurable intelligent surface (RIS) is a revolutionary technology in the field of wireless communications that can independently regulate the phase shift of electromagnetic signals incident on its own surface, thereby effectively improving the transmission environment and performance when the direct link of the communication system is blocked.

However, the sole use of RIS communication is not sufficient to meet the demand of massive access for 6G communication, and the power-domain non-orthogonal multiple access (NOMA) technique not only realizes massive multiple access, but also maintains user fairness compared with orthogonal multiple access schemes. Therefore, the combination of power-domain NOMA and RIS is expected to be widely used in the upcoming 6G era.

NOMA and RIS technologies are increasingly used in a wide range of complex and diverse scenarios. In practical communication systems, the transceiver hardware of wireless nodes is inevitably subject to various types of losses. Although these losses can be mitigated by some compensation and calibration algorithms, there are still incorrect calibration, so that the hardware loss cannot be completely removed. Hardware loss also has a significant adverse impact on system performance.

SUMMARY

In NOMA systems with eavesdroppers and obstructed or blocked direct links, to improve the physical layer security performance of the system, the disclosure provides a wireless secure communication method based on RIS-NOMA under complex channel conditions. Firstly, an intelligent surface is assume to be disposed between the base station and legitimate NOMA users, and between the base station and eavesdroppers; the signal to interference plus distortion noise ratio (SIDNR) for the legitimate NOMA user and the eavesdropper is calculated in the presence of RHI in the system; secondly, considering shadow fading and to simplify the overly complex calculation process, the probability density function and cumulative distribution function of the shadow fading are approximated; finally, the outage probability and intercept probability of the legitimate users and eavesdroppers are calculated.

The disclosure provides a wireless secure communication method using reconfigurable intelligent surface-non-orthogonal multiple access (RIS-NOMA) under complex channel conditions; the RIS-NOMA refers to a RIS-NOMA communication system comprising: a base station (BS), a reconfigurable intelligent surface (RIS), a legitimate NOMA user, and an eavesdropper (Eve); the legitimate NOMA user comprises a legitimate remote user $D_m$ and a legitimate near user $D_n$, and the base station communicates with the reconfigurable intelligent surface (RIS); the reconfigurable intelligent surface (RIS) communicates with the legitimate NOMA user; the eavesdropper (Eve) intercepts a signal transmitted by the RIS; an arbitrary channel link obeys κ-μ shadow fading; each node in the RIS-NOMA communication system encounters a residual hardware impairment (RHI), and the method comprising:

1) calculating a signal to interference plus distortion noise ratio (SIDNR) for the legitimate NOMA user and the eavesdropper in the presence of RHI in the system;
2) approximating a probability density function and cumulative distribution function for the κ-μ shadow fading;
3) calculating an outage probability of the legitimate NOMA user and an intercept probability of the eavesdropper; and
4) transforming the calculation of the outage probability of the legitimate NOMA user and the intercept probability of the eavesdropper into solving a cumulative distribution function of equivalent channel coefficients of corresponding joint channels, whereby measuring physical layer secure transmission performance of the system.

In a class of this embodiment, 1) is performed as follows:

defining a channel coefficient from the base station to an ith RIS reflecting surface in the system as $h_{si}$, and channel coefficients from the RIS to the legitimate NOMA user and to the eavesdropper as $g_{id_u}$, u∈(n,m) and $g_{ie}$, respectively;

in the NOMA system, because the legitimate near user $D_n$ is closer to the base station BS than the legitimate remote user $D_m$, with stronger channels; according to the NOMA principle, less transmission power is allocated to the legitimate near user $D_n$, and more power is allocated to the legitimate remote user $D_m$; for the legitimate near user $D_n$, due to being close to the base station, the channel gain is relatively large, and the corresponding allocated power is relatively small, so the signal strength thereof is also relatively small. For the legitimate near user $D_n$, the channel gain weak signals $x_m$ are eliminated through SIC.

When the legitimate near user $D_n$ detects a weak signal $x_m$, the signal to interference plus distortion to noise ratio SIDNR is expressed as:

$$\gamma_{D_n \to D_m} = \frac{\alpha_m {A_n}^2}{{A_n}^2\left(\alpha_n + \rho_{SD_n}^2\right) + \frac{d_B^{\tau} d_{R,n}^{\tau}}{\rho_S}}; \tag{1}$$

where, $\alpha_m$ and $\alpha_n$ represent power distribution coefficients of the legitimate remote user $D_m$ and the legitimate near user $D_n$, respectively, and $$\alpha_n < \alpha_m, \alpha_m + \alpha_n = 1; \rho_S = \frac{P_S}{\sigma_D^2}$$

represents an average signal-to-noise ratio of a legal link, Ps is a transmit power of BS, and is an additive white Gaussian noise channel variance; $\rho_{SD_n}$ represents an overall RHI level of a link BS→$D_n$;

$$A_n = \sum_{i=1}^{N} |h_{si}||g_{id_n}|$$

represents a joint channel coefficient of the link BS→$D_n$; $h_{si}$ is a channel coefficient of a link BS→RIS; $g_{id_n}$ is a channel coefficient of a link RIS→$D_n$; |•| represents modeling; $d_B$ and $d_{R,n}$ represent a distance from the base station to the RIS and a distance from the RIS to the legitimate near user $D_n$, respectively; and τ represents a path fading index;

through SIC technology, the SIDNR of $D_n$ decoding its own signal is given by the following equation:

$$\gamma_{D_n} = \frac{\alpha_n A_n^2}{A_n^2 \rho_{SD_n}^2 + \frac{d_B^\tau d_{R,n}^\tau}{\rho_S}}; \tag{2}$$

when $D_m$ decodes its own signal, a signal $x_n$ with strong channel gain is considered as noise, and SIDNR is represented as follows:

$$\gamma_{D_m} = \frac{\alpha_m A_m^2}{A_m^2(\alpha_n + \rho_{SD_m}^2) + \frac{d_B^\tau d_{R,m}^\tau}{\rho_S}}; \tag{3}$$

where $$A_m = \sum_{i=1}^{N} |h_{si}||g_{id_m}|; g_{id_m}$$

is a channel coefficient of a link RIS→$D_m$;

when the eavesdropper intercepts the signals $x_n$ and $x_m$ respectively, the obtained SIDNR is expressed as follows:

$$\gamma_{E_n} = \frac{\alpha_n A_e^2}{A_e^2 \rho_{SE}^2 + \frac{d_B^\tau d_{R,e}^\tau}{\rho_E}} \tag{4}$$

$$\gamma_{E_m} = \frac{\alpha_m A_e^2}{A_e^2(\alpha_n + \rho_{SE}^2) + \frac{d_B^\tau d_{R,e}^\tau}{\rho_E}} \tag{5}$$

$$\rho_E = \frac{P_S}{\sigma_E^2}$$

represents SNR of an eavesdropping link;

$$A_e = \sum_{i=1}^{N} |h_{si}||g_{ie}|; g_{ie}$$

represents a joint channel coefficient of a link $$RIS \to Eve; \sigma_E^2$$

represents an additive white Gaussian noise channel variance of the eavesdropper; $\rho_{SE}$ represents an overall RHI level of a link BS→Eve; and $d_{R,e}$ represents a distance from the RIS to the eavesdropper.

In a class of this embodiment, 2) is performed as follows:

SIDNR of the legitimate NOMA user and the eavesdropper contains $$A_u = \sum_{i=1}^{N} |h_{si}||g_{d_{iu}}|, u \in (n, m) \text{ and } A_e = \sum_{i=1}^{N} |h_{si}||g_{ie}|$$

as equivalent channel coefficients for corresponding joint channels; assuming that envelopes $|h_{si}|$, $|g_{id_u}|$, u∈(n,m) and $|g_{ie}|$ of all instantaneous channel coefficients are subject to independent and identically distributed k–μ shadow fading, and X represents the envelopes $|h_{si}|$, $|g_{id_u}|$, u∈(n,m) and $|g_{ie}|$ of instantaneous channel coefficients, the cumulative distribution functions and probability density functions thereof are represented as follows:

$$F_X(x) = \frac{\mu^{\mu-1} m^m (1+k)^\mu}{\Gamma(\mu)(\mu k + m)^m}\left(\frac{1}{R}\right)^{2\mu} x^{2\mu}\Phi_2\left(\mu - m, m, \mu + 1; -\frac{\mu(1+k)x^2}{R^2}, -\frac{\mu(1+k)}{R^2}\frac{mx^2}{\mu k + m}\right) \tag{6}$$

$$\begin{aligned} f_X(x) = &= \frac{2\mu^\mu m^m (1+k)^\mu}{\Gamma(\mu)(\mu k + m)^m}\left(\frac{1}{R^{2\mu}}\right) x^{2\mu-1}\exp\left(-\frac{\mu(1+k)}{R^2}x^2\right){}_1F_1\left(m, \mu; \frac{\mu^2 k(1+k)}{(\mu k + m)R^2}x^2\right) \\ &= \frac{2a^\mu}{\Gamma(\mu)b^m} x^{2\mu-1}\exp(-ax)\,{}_1F_1\left(m, \mu; \frac{\mu^2 k(1+k)}{(\mu k + m)R^2}x^2\right) \end{aligned} \tag{7}$$

Γ(•), $\Phi_2$(•) and ${}_1F_1$(•) are defined as a Gamma function, binary confluence hypergeometric function, and confluence hypergeometric function, respectively;

$$a = \frac{\mu(1+k)}{\Omega}, b = \frac{\mu k + m}{m};$$

k is a ratio of a total power of dispersed components to dominant sight components, μ is a total number of multipath clusters, m is a fading degree parameter, and R is an average power of the channel;

to simplify calculation, the cumulative distribution function and probability density function of the k–μ shadow distribution are approximated as follows:

$$F_X(x) \approx \frac{\alpha^\alpha x^{1\alpha}}{\Gamma(\alpha+1)R^{2\alpha}}\,{}_1F_1\left(\alpha, \alpha+1, \frac{-x^2\alpha}{R^2}\right) \tag{8}$$

$$f_X(x) \approx \frac{2\alpha^\alpha x^{2\alpha-1}}{R^{2\alpha}\Gamma(\alpha)}\exp\left(\frac{-x^2}{R^2}\alpha\right); \tag{9}$$

$$\text{and } \alpha = \frac{m\mu(1+k)^2}{m+\mu k^2+2mk}$$

In a class of this embodiment, in 3), the outage probability of the legitimate NOMA user is calculated as follows:

when a channel capacity of a main channel is less than a set threshold $R_u$, and u∈(n,m), an interrupt event occurs;

$$C_u = \frac{1}{2}\log_2(1+\gamma_{D_u})$$

represents the channel capacity of the main channel, and the outage probability of a legitimate NOMA user $D_u$ is expressed as follows:

$$\begin{aligned} P_{out,n} &= Pr\{C_u \le R_u\} \\ &= Pr\{\gamma_{D_u} \le 2^{2R_u}-1\} \\ &= F_{\gamma_{D_u}}(2^{2R_u}-1) \end{aligned} \tag{10}$$

3.1) the outage probability of the legitimate near user $D_n$:

$$\begin{aligned} P_{out,n} &= Pr\{C_n \le R_n\} \\ &= F_{\gamma_{D_n}}(2^{2R_n}-1) \end{aligned}; \tag{11}$$

$$F_{\gamma_{D_n}}(x)$$

is expressed as:

$$\begin{aligned} F_{\gamma_{D_m}}(x) &= Pr\{\gamma_{D_n} \le x\} \\ &= Pr\left\{\frac{\alpha_n A_n^2}{A_n^2\rho_{SD_n}^2 + \frac{d_B^\tau d_{R,n}^\tau}{\rho_s}} \le x\right\} \\ &= Pr\left\{A_n^2 \le \frac{d_B^\tau d_{R,n}^\tau x}{\rho_S(\alpha_n - x\rho_{SD_n}^2)}\right\} \\ &= F_{A_n}\left(\sqrt{\frac{d_B^\tau d_{R,n}^\tau x}{\rho_S(\alpha_n - x\rho_{SD_n}^2)}}\right) \end{aligned} \tag{12}$$

$F_{A_n}(x)$ represents a cumulative distribution function of $A_n$;

3.2) the outage probability of the legitimate remote user $D_m$:

$$\begin{aligned} P_{out}, m &= Pr\{C_m \le R_m\} \\ &= F_{\gamma_{D_m}}(2^{2R_m}-1) \end{aligned} \tag{13}$$

$$F_{\gamma_{D_m}}(x)$$

is expressed as:

$$\begin{aligned} F_{\gamma_{D_m}}(x) &= Pr\{\gamma_{D_m} \le x\} \\ &= Pr\left\{\frac{\alpha_m A_m^2}{A_m^2(\alpha_n+\rho_{SD_m}^2) + \frac{d_B^\tau d_{R,m}^\tau}{\rho_S}} \le x\right\} \\ &= Pr\left\{A_m^2 \le \frac{d_B^\tau d_{R,m}^\tau x}{\rho_S(\alpha_m - x(\alpha_n+\rho_{SD_m}^2))}\right\} \\ &= F_{A_m}\left(\sqrt{\frac{d_B^\tau d_{R,m}^\tau x}{\rho_S(\alpha_m - x(\alpha_n+\rho_{SD_m}^2))}}\right) \end{aligned} \tag{14}$$

$F_{A_m}(x)$ represents a cumulative distribution function of $A_m$.

In a class of this embodiment, in 3), the intercept probability of the eavesdropper is calculated as follows:

when a channel capacity of an eavesdropping channel is greater than a transmission rate, an interception event occurs;

$$C_{E_u} = \frac{1}{2}\log_2(1+\gamma_{D_{E_u}})$$

represents the channel capacity of the eavesdropping channel, and the intercept probability that the eavesdropper intercepts a legitimate user's information is denoted as follows:

$$\begin{aligned} P_{int,n} &= P_r(C_{E_u} > R_u) \\ &= 1 - P_r(C_{E_u} \le R_u) \\ &= 1 - P_r(\gamma_{E_u} \le 2^{2R_u}-1) \\ &= 1 - F_{\gamma_{E_u}}(2^{2R_u}-1) \end{aligned}; \tag{15}$$

3.3) the intercept probability when the eavesdropper intercepts the legitimate near user $D_n$:

$$\begin{aligned} P_{int,n} &= P_r(C_{E_n} > R_n) \\ &= 1 - P_r(C_{E_n} \le R_n) \\ &= 1 - F_{\gamma_{E_n}}(2^{2R_n}-1) \end{aligned}; \tag{16}$$

$$F_{\gamma_{E_n}}(x)$$

is expressed as:

$$F_{\gamma_{E_n}}(x)=Pr\{\gamma_{E_n}\le x\}=Pr\left\{\frac{\alpha_n A_e^2}{A_e^2\rho_{SE}^2+\frac{d_B^\tau d_{R,e}^\tau}{\rho_E}}\le x\right\}=Pr\left\{A_e^2\le\frac{d_B^\tau d_{R,e}^\tau x}{\rho_E(\alpha_n-x\rho_{SE}^2)}\right\};=F_{A_e}\left(\sqrt{\frac{d_B^\tau d_{R,e}^\tau x}{\rho_E(\alpha_n-x\rho_{SE}^2)}}\right)\quad(17)$$

$F_{A_e}(x)$ represents a cumulative distribution function of $A_e$;

3.4) the intercept probability when the eavesdropper intercepts the legitimate remote user $D_m$:

$$P_{int,m}=P_r(C_{E_m}>R_m)=1-P_r(C_{E_m}\le R_m)=1-F_{\gamma_{E_m}}(2^{2R_m}-1)\quad(18)$$

$$F_{\gamma_{E_m}}(x)$$

is expressed as:

$$F_{\gamma_{E_m}}(x)=Pr\{\gamma_{E_m}\le x\}=Pr\left\{\frac{\alpha_m A_e^2}{A_e^2(\alpha_n+\rho_{SE}^2)+\frac{d_B^\tau d_{R,e}^\tau}{\rho_E}}\le x\right\}=Pr\left\{A_e^2\le\frac{d_B^\tau d_{R,e}^\tau x}{\rho_E(\alpha_m-x(\alpha_n+\rho_{SE}^2))}\right\}=F_{A_e}\left(\sqrt{\frac{d_B^\tau d_{R,e}^\tau x}{\rho_E(\alpha_m-x(\alpha_n+\rho_{SE}^2))}}\right)\quad(19)$$

$F_{A_e}(x)$ represents a cumulative distribution function of $A_e$.

In a class of this embodiment, 4) is performed as follows: given $$A_u=\sum_{i=1}^{N}|h_{si}||g_{id_u}|,\ \text{let}\ X_i=X_{i1}X_{i2}=|h_{si}||g_{id_u}|,\ \text{and}\ A_u=\sum_{i=1}^{N}X_i,$$

approximating PDF and CDF of $A_u$ as follows:

$$f_{A_u}(x)=a_1G_{1,2}^{2,0}\left(\frac{x}{a_2}\middle|\begin{matrix}-;a_3\\a_4;a_5\end{matrix}\right)\quad(20)$$

$$F_{A_u}(x)\approx a_1a_2G_{2,3}^{2,1}\left(\frac{x}{a_2}\middle|\begin{matrix}1;a_3+1\\a_4+1;a_5+1;0\end{matrix}\right),\ x\ge 0\quad(21)$$

$$a_1=\frac{\Gamma(a_3+1)}{a_2\Gamma(a_4+1)\Gamma(a_5+1)}\quad(22)$$

$$a_2=\frac{a_3}{2}(\varphi_4-2\varphi_3+\varphi_2)+2\varphi_4-3\varphi_3+\varphi_2\quad(23)$$

$$a_3=\frac{4\varphi_4-9\varphi_3+6\varphi_2-\mu_1}{-\varphi_4+3\varphi_3-3\varphi_2+\mu_1}\quad(24)$$

$$a_4=\frac{a_6+a_7}{2}\quad(25)$$

$$a_5=\frac{a_6-a_7}{2}\quad(26)$$

$$a_6=\frac{a_3(\varphi_2-\mu_1)+2\varphi_2-\mu_1}{a_2}-3\quad(27)$$

$$a_7=\sqrt{\left(\frac{a_3(\varphi_2-\mu_1)+2\varphi_2-\mu_1}{a_2}-1\right)^2-4\frac{\mu_1(a_3+1)}{a_2}}\quad(28)$$

$$\varphi_i=\frac{\mu_i}{\mu_{i-1}},\ i\ge 1\quad(29)$$

$$\mu_1=\sum_{i=1}^{N}\mu_1^{(i)}=N\mu_1^{(i)}\quad(30)$$

$$\mu_2=E\left[\left(\sum_{i=1}^{N}X_i\right)^2\right]+2\sum_{i=1}^{N-1}\sum_{j=m+1}^{M}E[X_i]E[X_j]=N\mu_2^{(i)}+2\binom{N}{2}E[X_i]E[X_j]=N\mu_2^{(i)}+N(N-1)\mu_1^{(i)}\mu_1^{(i)}\quad(31)$$

where, E[•] represents expectation;

$$\begin{cases}N\ge 3,\\ \mu_3=E\left[\left(\sum_{i=1}^{N}X_i\right)^3\right]=\sum_{i=1}^{N}E[X_i^3]+3\sum_{i=1}^{N}\sum_{\substack{j=1\\j\ne i}}^{N}E[X_i]E[X_j^2]+6\sum_{i=1}^{N-2}\sum_{j=i+1}^{N-1}\sum_{k=j+1}^{N}E[X_i]E[X_j]E[X_k]\\ \quad=N\mu_3^{(i)}+3N(N-1)\mu_1^{(i)}\mu_2^{(i)}+N(N-1)(N-2)\mu_1^{(i)}\mu_1^{(i)}\mu_1^{(i)}\\ N=2,\\ \mu_3=2\mu_3^{(i)}+3\times 2\mu_1^{(i)}\mu_2^{(i)}\\ N=1,\\ \mu_3=\mu_3^{(i)}\end{cases}\quad(32)$$

-continued $$\begin{cases} N \geq 4, \\ \mu_4 = E\left[\left(\sum_{i=1}^{N} X_i\right)^4\right] = \sum_{i=1}^{N} E\left[X_i^4\right] + 6\sum_{i=1}^{N-1}\sum_{j=i+1}^{N} E\left[X_i^2 X_j^2\right] + 4\sum_{i=1}^{N}\sum_{\substack{j=1 \\ j\neq i}}^{N} E\left[X_i^3 X_j\right] + 12\sum_{i=1}^{N}\sum_{\substack{j=1 \\ j\neq i}}^{N}\sum_{\substack{k>j \\ k\neq i}}^{N} E\left[X_i^2 X_j X_k\right] + 24\sum_{i<j<k<l} E\left[X_i X_j X_k X_l\right] \\ \quad = N\mu_4^{(i)} + 3N(N-1)\mu_2^{(i)}\mu_2^{(i)} + 4N(N-1)\mu_3^{(i)}\mu_1^{(i)} + 6N(N-1)(N-2)\mu_2^{(i)}\mu_1^{(i)}\mu_1^{(i)} + N(N-1)(N-2)(N-3)\mu_1^{(i)}\mu_1^{(i)}\mu_1^{(i)}\mu_1^{(i)} \\ N = 3, \\ \mu_4 = 3\mu_4^{(i)} + 6\sum_{i=1}^{2}\sum_{j=i+1}^{3} E\left[X_i^2 X_j^2\right] + 4\sum_{i=1}^{3}\sum_{\substack{j=1 \\ j\neq i}}^{3} E\left[X_i^3 X_j\right] + 12\left(E\left[X_1^2 X_2 X_3\right] + E\left[X_2^2 X_1 X_3\right] + E\left[X_3^2 X_1 X_2\right]\right) \\ \quad = 3\mu_4^{(i)} + 24\mu_1^{(i)}\mu_3^{(i)} + 18\mu_2^{(i)}\mu_2^{(i)} + 36\mu_2^{(i)}\mu_1^{(i)}\mu_1^{(i)} \\ N = 2, \\ \mu_4 = 2\mu_4^{(i)} + 4\left(E[X_1]E\left[X_2^3\right] + E[X_2]E\left[X_1^3\right]\right) + 6E\left[X_1^2\right]E\left[X_2^2\right] \\ \quad = 2\mu_4^{(i)} + 8\mu_1^{(i)}\mu_3^{(i)} + 6\mu_2^{(i)}\mu_2^{(i)} \\ N = 1, \\ \mu_4 = \mu_4^{(i)} \end{cases} \tag{33}$$

to obtain $a_1$, $a_2$, $a_3$, $a_4$, first four moments of $\mu_l$ are calculated, and $\mu_l^{(i)}$ ($1 \leq l \leq 4$) of a variable $A_u$ is first calculated:

$$\mu_1^{(i)} = E[X_i] = E[X_{i1}X_{i2}] = E\left[|h_{si}|\left|g_{id_k}\right|\right] = E[|h_{si}|]E\left[\left|g_{id_k}\right|\right] \tag{34}$$

$$\mu_2^{(i)} = E\left[X_i^2\right] = E\left[X_{i1}^2 X_{i2}^2\right] = E\left[|h_{si}|^2\left|g_{id_k}\right|^2\right] = E\left[|h_{si}|^2\right]E\left[\left|g_{id_k}\right|^2\right] \tag{35}$$

$$\mu_3^{(i)} = E\left[X_i^3\right] = E\left[X_{i1}^3 X_{i2}^3\right] = E\left[|h_{si}|^3\left|g_{id_k}\right|^3\right] = E\left[|h_{si}|^3\right]E\left[\left|g_{id_k}\right|^3\right] \tag{36}$$

$$\mu_4^{(i)} = E\left[X_i^4\right] = E\left[X_{i1}^4 X_{i2}^4\right] = E\left[|h_{si}|^4\left|g_{id_k}\right|^4\right] = E\left[|h_{si}|^4\right]E\left[\left|g_{id_k}\right|^4\right] \tag{37}$$

In a class of this embodiment, the $\mu_l^{(i)}$ ($1 \leq l \leq 4$) of a variable $A_u$ is calculated as follows:

firstly, calculating the expectations of $X_{i1}$ and $X_{i2}$, and calculating the expectation of $f_{X_{i1}}(x)$ as follows:

$$\begin{aligned} E[|h_{si}|] = E\left[\left|g_{id_k}\right|\right] &= \int_0^\infty x f_{X_{i1}}(x)dx \\ &= \int_0^\infty x\frac{2\alpha^\alpha x^{2\alpha-1}}{R^{2\alpha}\Gamma(\alpha)}\exp\left(\frac{-x^2}{R^2}\alpha\right)dx \\ &= \frac{\alpha^\alpha\left(\frac{\alpha}{R^2}\right)^{-0.5-\alpha}R^{-2\alpha}\Gamma(0.5+\alpha)}{\Gamma(\alpha)} \end{aligned} \tag{38}$$

substituting formula (38) into formula (34), to yield:

$$\mu_1^{(i)} = \left(\frac{\alpha^\alpha\left(\frac{\alpha}{R^2}\right)^{-0.5-\alpha}R^{-2\alpha}\Gamma(0.5+\alpha)}{\Gamma(\alpha)}\right)^2 \tag{39}$$

parsing processes of $\mu_2^{(i)}$, $\mu_3^{(i)}$, $\mu_4^{(i)}$ are the same as that of $\mu_l^{(i)}$:

$$\mu_2^{(i)} = \left(\alpha^\alpha\left(\frac{\alpha}{R^2}\right)^{-\alpha}R^{2-2\alpha}\right)^2 \tag{40}$$

$$\mu_3^{(i)} = \left(\frac{\alpha^\alpha\left(\frac{\alpha}{R^2}\right)^{-1.5-\alpha}R^{-2\alpha}\Gamma(1.5+\alpha)}{\Gamma(\alpha)}\right)^2 \tag{41}$$

$$\mu_4^{(i)} = \left(\frac{\alpha^\alpha(1+\alpha)\left(\frac{\alpha}{R^2}\right)^{-2-\alpha}R^{-2\alpha}\Gamma(1+\alpha)}{\Gamma(\alpha)}\right)^2 \tag{42}$$

to obtain the outage probability of the legitimate NOMA user and the intercept probability when the eavesdropper intercepts the information $x_n$ and $x_m$:

$$P_{out,n} = F_{A_n}\left(\sqrt{\frac{d_B^\tau d_{R,n}^\tau\left(2^{2R_n}-1\right)}{\rho_s\left(\alpha_n - x\rho_{SD_n}^2\right)}}\right) = a_1 a_2 G_{2,3}^{2,1}\left(\frac{\sqrt{\frac{d_B^\tau d_{R,n}^\tau\left(2^{2R_n}-1\right)}{\rho_s\left(\alpha_n - \left(2^{2R_n}-1\right)\rho_{SD_n}^2\right)}}}{a_2}\,\middle|\,\begin{matrix} 1;\ a_3+1 \\ a_4+1;\ a_5+1;\ 0 \end{matrix}\right) \tag{43}$$

$$P_{out,m} = F_{A_m}\left(\sqrt{\frac{d_B^\tau d_{R,m}^\tau x}{\rho_S\left(\alpha_m - x\left(\alpha_n + \rho_{SD_m}^2\right)\right)}}\right) = \tag{44}$$

-continued $$a_1 a_2 G_{2,3}^{2,1}\left( \frac{\sqrt{\frac{d_B^{\tau} d_{R,m}^{\tau}\left(2^{2R_m}-1\right)}{\rho_S\left(\alpha_m-\left(2^{2R_m}-1\right)\left(\alpha_n+\rho_{SD_m}^2\right)\right)}}}{a_2} \middle| \begin{matrix} 1; a_3+1 \\ a_4+1; a_5+1; 0 \end{matrix} \right)$$

$$\begin{aligned} P_{int,n} &= 1-P_r\left(C_{E_n}\le R_n\right) \\ &= 1-F_{\gamma_{E_n}}\left(2^{2R_n}-1\right) \\ &= 1-F_{A_e}\left(\sqrt{\frac{d_B^{\tau} d_{R,e}^{\tau}\left(2^{2R_n}-1\right)}{\rho_E\left(\alpha_n-\left(2^{2R_n}-1\right)\rho_{SE}^2\right)}}\right) \\ &= 1-a_1 a_2 G_{2,3}^{2,1}\left( \frac{\sqrt{\frac{d_B^{\tau} d_{R,e}^{\tau}\left(2^{2R_n}-1\right)}{\rho_E\left(\alpha_n-\left(2^{2R_n}-1\right)\rho_{SE}^2\right)}}}{a_2} \middle| \begin{matrix} 1; a_3+1 \\ a_4+1; a_5+1; 0 \end{matrix} \right) \end{aligned} \tag{45}$$

$$\begin{aligned} P_{int,m} &= 1-P_r\left(C_{E_m}\le R_m\right) \\ &= 1-F_{\gamma_{E_m}}\left(2^{2R_m}-1\right) \\ &= 1-F_{A_e}\left(\sqrt{\frac{d_B^{\tau} d_{R,e}^{\tau}\left(2^{2R_m}-1\right)}{\rho_E\left(\alpha_m-\left(2^{2R_m}-1\right)\left(\alpha_n+\rho_{SE}^2\right)\right)}}\right) \\ &= 1-a_1 a_2 G_{2,3}^{2,1}\left( \frac{\sqrt{\frac{d_B^{\tau} d_{R,e}^{\tau}\left(2^{2R_m}-1\right)}{\rho_E\left(\alpha_m-\left(2^{2R_m}-1\right)\left(\alpha_n+\rho_{SE}^2\right)\right)}}}{a_2} \middle| \begin{matrix} 1; a_3+1 \\ a_4+1; a_5+1; 0 \end{matrix} \right) \end{aligned} \tag{46;}$$

thus completing secure transmission of the physical layer of the system.

The following advantages are associated with the wireless secure communication method using reconfigurable intelligent surface-non-orthogonal multiple access (RIS-NOMA) under complex channel conditions of the disclosure:

1. Compared with traditional NOMA systems and RIS-assisted OMA systems, the method of the disclosure considers the actual complex channel environment, and the RIS assisted physical layer security performance evaluation of the NOMA systems is more in line with practical scenarios.
2. The fading channel of the disclosure is universal and can be applied to various wireless communication environments.
3. The hardware loss considered in the method is of great significance in practical communication systems.

DETAILED DESCRIPTION

To further illustrate the disclosure, embodiments detailing a wireless secure communication method using reconfigurable intelligent surface-non-orthogonal multiple access (RIS-NOMA) under complex channel conditions are described below. It should be noted that the following embodiments are intended to describe and not to limit the disclosure.

Figure 2:
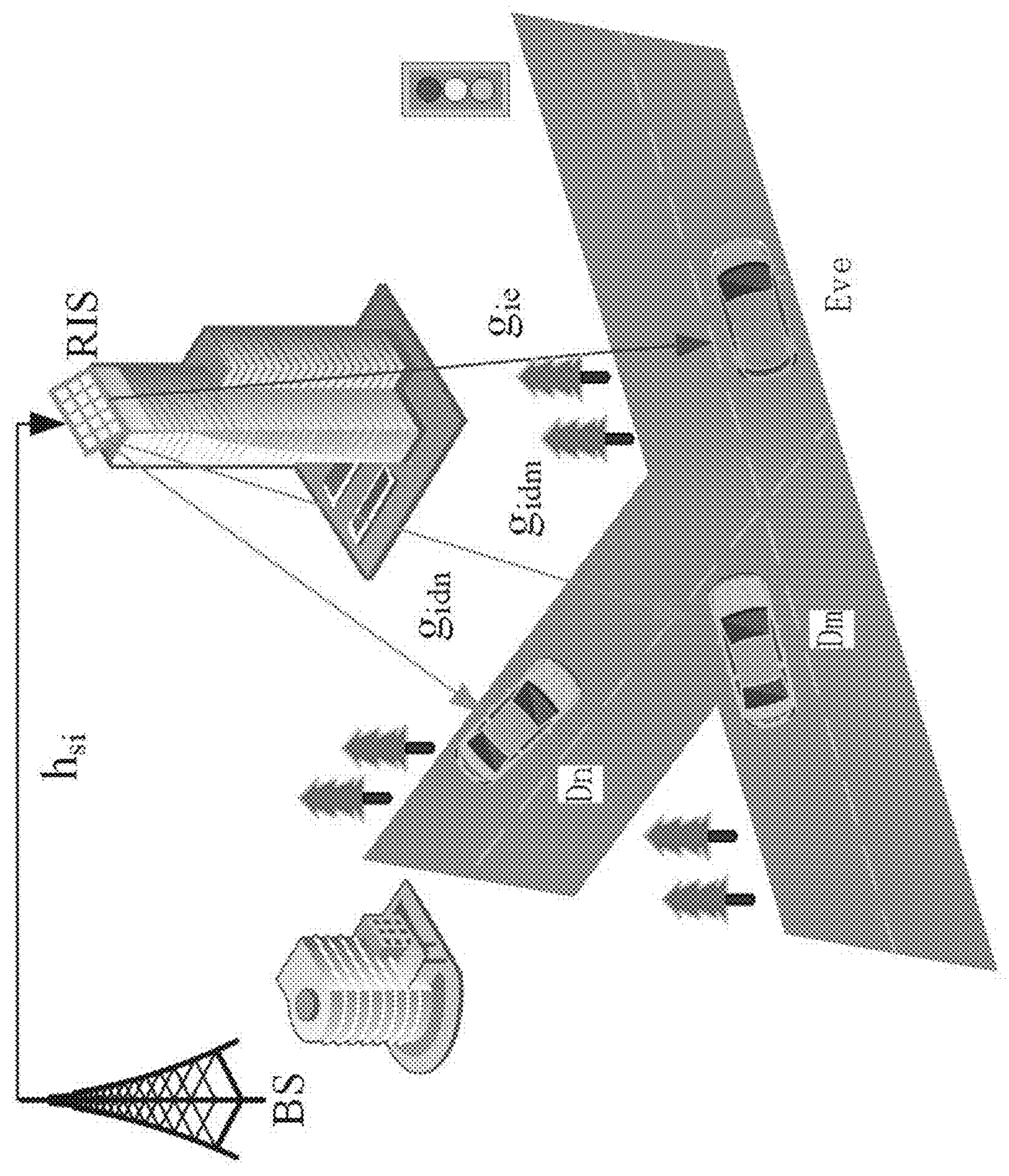
FIG. 2 is a model diagram of a RIS-NOMA communication system of the disclosure.

FIG. 2 is a model diagram of a RIS-NOMA communication system of the disclosure, which comprises a base station (BS), a reconfigurable intelligent surface (RIS), a legitimate NOMA user, and an eavesdropper (Eve); the legitimate NOMA user comprises a legitimate remote user $D_m$, and a legitimate near user $D_n$, and the base station communicates with the reconfigurable intelligent surface (RIS); the reconfigurable intelligent surface (RIS) communicates with the legitimate NOMA user; the eavesdropper (Eve) intercepts a signal transmitted by the RIS; an arbitrary channel link obeys κ-μ shadow fading; each node in the RIS-NOMA communication system encounters a residual hardware impairment (RHI).

Figure 1:
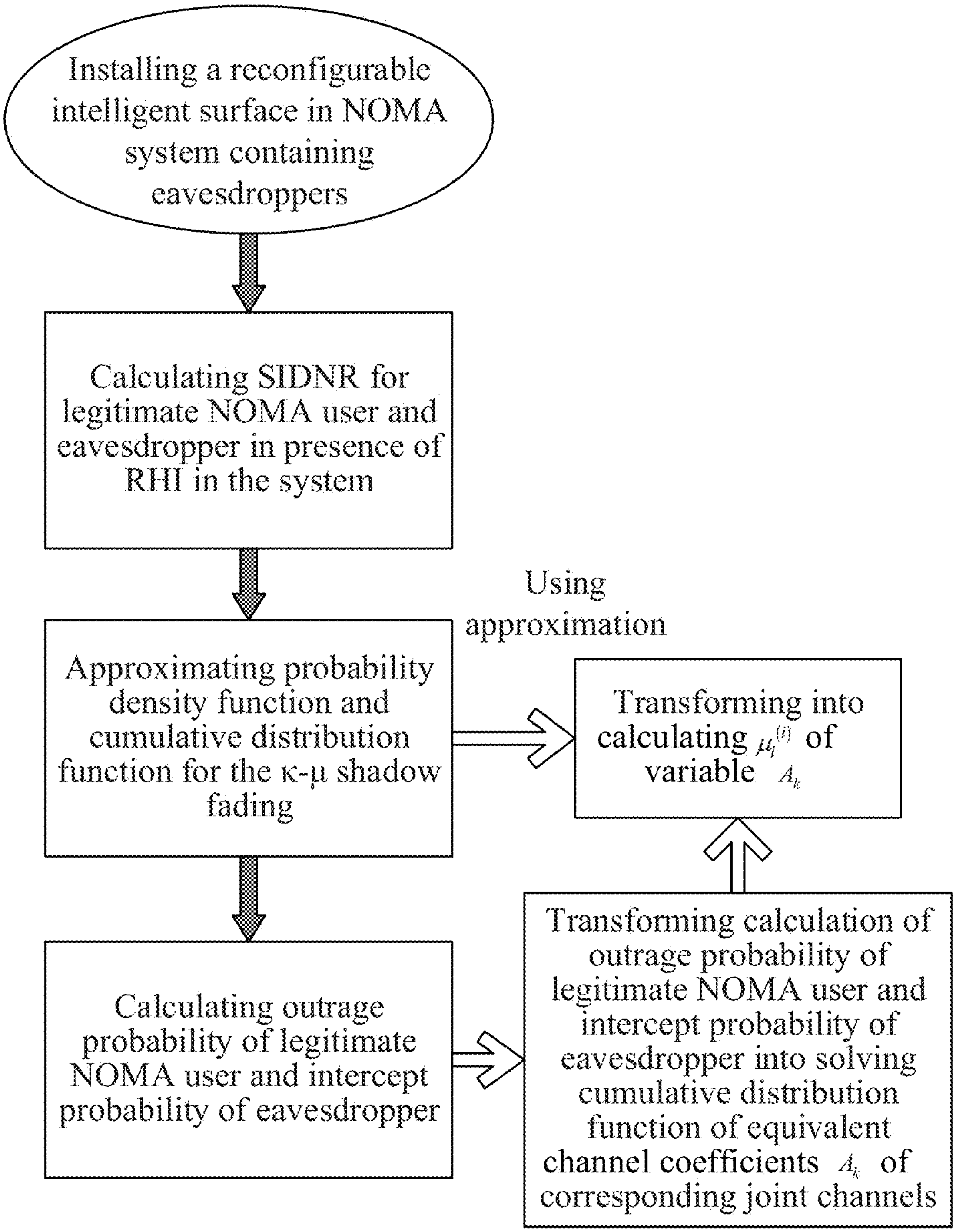
FIG. 1 is a flow chart of a wireless secure communication method using reconfigurable intelligent surface-non-orthogonal multiple access (RIS-NOMA) under complex channel conditions.

The wireless secure communication method using reconfigurable intelligent surface-non-orthogonal multiple access (RIS-NOMA) under complex channel conditions, as shown in FIG. 1, comprises:

1) calculating a signal to interference plus distortion noise ratio (SIDNR) for the legitimate NOMA user and the eavesdropper in the presence of RHI in the system, which is performed as follows:

defining a channel coefficient from the base station to an ith RIS reflecting surface in the system as $h_{si}$, and channel coefficients from the RIS to the legitimate NOMA user and to the eavesdropper as $g_{id_u}$, u∈(n,m) and $g_{ie}$, respectively;

when the legitimate near user $D_n$ detects a weak signal $x_m$, the signal to interference plus distortion to noise ratio SIDNR is expressed as:

$$\gamma_{D_n\to D_m}=\frac{\alpha_m A_n^2}{A_n^2(\alpha_n+\rho_{SD_n}^2)+\frac{d_B^\tau d_{R,n}^\tau}{\rho_S}} \quad (1);$$

where, $\alpha_m$ and $\alpha_n$ represent power distribution coefficients of the legitimate remote user $D_m$ and the legitimate near user $D_n$, respectively, and $$\alpha_n<\alpha_m,\ \ \alpha_m+\alpha_n=1;\ \ \rho_S=\frac{P_S}{\sigma_D^2}$$

represents an average signal-to-noise ratio of a legal link, Ps is a transmit power of BS, and is an additive white Gaussian noise channel variance; $\rho_{SD_n}$ represents an overall RHI level of a link BS→$D_n$;

$$A_n=\sum_{i=1}^N |h_{si}|\,|g_{id_n}|$$

represents a joint channel coefficient of the link BS→$D_n$; $h_{si}$ is a channel coefficient of a link BS→RIS; $g_{id_n}$ is a channel coefficient of a link RIS→$D_n$; |•| represents modeling; $d_B$ and $d_{R,n}$ represent a distance from the base station to the RIS and a distance from the RIS to the legitimate near user $D_n$, respectively; and τ represents a path fading index;

through SIC technology, the SIDNR of $D_n$ decoding its own signal is given by the following equation:

$$\gamma_{D_n}=\frac{\alpha_n A_n^2}{A_n^2\rho_{SD_n}^2+\frac{d_B^\tau d_{R,n}^\tau}{\rho_S}} \quad (2);$$

when $D_m$ decodes its own signal, a signal $x_n$ with strong channel gain is considered as noise, and SIDNR is represented as follows:

$$\gamma_{D_m}=\frac{\alpha_m A_m^2}{A_m^2(\alpha_n+\rho_{SD_m}^2)+\frac{d_B^\tau d_{R,m}^\tau}{\rho_S}} \quad (3);$$

where $$A_m=\sum_{i=1}^N |h_{si}|\,|g_{id_m}|;\ g_{id_m}$$

is a channel coefficient of a link RIS→$D_m$;

when the eavesdropper intercepts the signals $x_n$ and $x_m$ respectively, the obtained SIDNR is expressed as follows:

$$\gamma_{E_n}=\frac{\alpha_n A_n^2}{A_e^2\rho_{SE}^2+\frac{d_B^\tau d_{R,e}^\tau}{\rho_E}} \quad (4)$$

$$\gamma_{E_m}=\frac{\alpha_m A_e^2}{A_e^2(\alpha_n+\rho_{SE}^2)+\frac{d_B^\tau d_{R,e}^\tau}{\rho_E}} \quad (5)$$

$$\rho_E=\frac{P_S}{\sigma_E^2}$$

represents SNR of an eavesdropping link;

$$A_e=\sum_{i=1}^N |h_{si}|\,|g_{ie}|;\ g_{ie}$$

represents a joint channel coefficient of a link $$RIS\to \text{Eve};\ \sigma_E^2$$

represents an additive white Gaussian noise channel variance of the eavesdropper; $\rho_{SE}$ represents an overall RHI level of a link BS→Eve; and $d_{R,e}$ represents a distance from the RIS to the eavesdropper;

2) approximating a probability density function and cumulative distribution function for the κ-μ shadow fading, which is performed as follows:

SIDNR of the legitimate NOMA user and the eavesdropper contains $$A_u=\sum_{i=1}^N |h_{si}||g_{d_{iu}}|,\ u\in(n,m)\ \text{and}\ A_e=\sum_{i=1}^N |h_{si}|\,|g_{ie}|$$

as equivalent channel coefficients for corresponding joint channels;

assuming that envelopes $|h_{si}|$, $|g_{id_u}|$, u∈(n,m) and $|g_{ie}|$ of all instantaneous channel coefficients are subject to independent and identically distributed k-μ shadow fading, and X represents the envelopes $|h_{si}|$, $|g_{id_u}|$, u∈(n,m) and $|g_{ie}|$ of instantaneous channel coefficients, the cumulative distribution functions and probability density functions thereof are represented as follows:

$$F_X(x)=\frac{\mu^{\mu-1}m^m(1+k)^\mu}{\Gamma(\mu)(\mu k+m)^m}\left(\frac{1}{R}\right)^{2\mu}x^{2\mu}\Phi_2\left(\mu-m,m,\mu+1;-\frac{\mu(1+k)x^2}{R^2},-\frac{\mu(1+k)}{R^2}\frac{mx^2}{\mu k+m}\right) \quad (6)$$

$$\begin{aligned}f_X(x)&=\frac{2\mu^\mu m^m(1+k)^\mu}{\Gamma(\mu)(\mu k+m)^m}\left(\frac{1}{R^{2\mu}}\right)x^{2\mu-1}\exp\left(-\frac{\mu(1+k)}{R^2}x^2\right){}_1F_1\left(m,\mu;\frac{\mu^2k(1+k)}{(\mu k+m)R^2}x^2\right)\\&=\frac{2\alpha^\mu}{\Gamma(\mu)b^m}x^{2,\mu-1}\exp(-\alpha x){}_1F_1\left(m,\mu;\frac{\mu^2k(1+k)}{(\mu k+m)R^2}x^2\right)\end{aligned} \quad (7)$$

$\Gamma(\bullet)$, $\Phi_2(\bullet)$ and ${}_1F_1(\bullet)$ are defined as a Gamma function, binary confluence hypergeometric function, and confluence hypergeometric function, respectively;

$$a=\frac{\mu(1+k)}{\Omega},\ b=\frac{\mu k+m}{m};$$

k is a ratio of a total power of dispersed components to dominant sight components, μ is a total number of multipath clusters, m is a fading degree parameter, and R is an average power of the channel;

to simplify calculation, the cumulative distribution function and probability density function of the k-μ shadow distribution are approximated as follows:

$$F_X(x)\approx\frac{\alpha^\alpha x^{2\alpha}}{\Gamma(\alpha+1)R^{2a}}{}_1F_1\left(\alpha,\alpha+1,\frac{-x^2\alpha}{R^2}\right) \quad (8)$$

$$f_X(x)\approx\frac{2\alpha^\alpha x^{2\alpha-1}}{R^{2\alpha}\Gamma(\alpha)}\exp\left(\frac{-x^2}{R^2}\alpha\right);\text{ and} \quad (9)$$

$$\alpha=\frac{m\mu(1+k)^2}{m+\mu k^2+2mk};$$

3) calculating an outage probability of the legitimate NOMA user and an intercept probability of the eavesdropper, which is performed as follows:

outage probability:

when a channel capacity of a main channel is less than a set threshold $R_u$, and u∈(n,m), an interrupt event occurs;

$$C_u=\frac{1}{2}\log_2(1+\gamma_{D_u})$$

represents the channel capacity of the main channel, and the outage probability of a legitimate NOMA user $D_u$ is expressed as follows:

$$\begin{aligned}P_{out,n}&=Pr\{C_U\le R_U\}\\&=Pr\{\gamma_{D_u}\le 2^{2R_u}-1\}\\&=F_{\gamma_{D_u}}(2^{2R_u}-1)\end{aligned} \quad (10)$$

3.1) the outage probability of the legitimate near user $D_n$:

$$\begin{aligned}P_{out,n}&=Pr\{C_n\le R_n\}\\&=F_{\gamma_{D_n}}(2^{2R_n}-1);\end{aligned} \quad (11)$$

$$F_{\gamma_{D_n}}(x)$$

is expressed as:

$$\begin{aligned}F_{\gamma_{D_n}}(x)&=Pr\{\gamma_{D_n}\le x\}\\&=Pr\left\{\frac{\alpha_nA_n^2}{A_n^2\rho_{SD_n}^2+\frac{d_B^\tau d_{R,n}^\tau}{\rho_S}}\le x\right\}\\&=Pr\left\{A_n^2\le\frac{d_B^\tau d_{R,n}^\tau x}{\rho_S(\alpha_n-x\rho_{SD_n}^2)}\right\}\\&=F_{A_n}\left(\sqrt{\frac{d_B^\tau d_{R,n}^\tau x}{\rho_S(\alpha_n-x\rho_{SD_n}^2)}}\right);\end{aligned} \quad (12)$$

$F_{A_n}(x)$ represents a cumulative distribution function of $A_n$;

3.2) the outage probability of the legitimate remote user $D_m$:

$$\begin{aligned}P_{out,m}&=Pr\{C_m\le R_m\}\\&=F_{\gamma_{D_m}}(2^{2R_m}-1)\end{aligned} \quad (13)$$

$$F_{\gamma_{D_m}}(x)$$

is expressed as:

$$\begin{aligned}F_{\gamma_{D_m}}(x)&=Pr\{\gamma_{D_m}\le x\}\\&=Pr\left\{\frac{\alpha_mA_m^2}{A_m^2\rho_{SD_m}^2+\frac{d_B^\tau d_{R,m}^\tau}{\rho_S}}\le x\right\}\\&=Pr\left\{A_m^2\le\frac{d_B^\tau d_{R,m}^\tau x}{\rho_S(\alpha_m-x(\alpha_n+\rho_{SD_m}^2))}\right\}\\&=F_{A_m}\left(\sqrt{\frac{d_B^\tau d_{R,m}^\tau x}{\rho_S(\alpha_n-x(\alpha_n+\rho_{SD_m}^2))}}\right)\end{aligned} \quad (14)$$

$F_{A_m}(x)$ represents a cumulative distribution function of $A_m$;

the intercept probability of the eavesdropper is calculated as follows:

when a channel capacity of an eavesdropping channel is greater than a transmission rate, an interception event occurs;

$$C_{E_u} = \frac{1}{2}\log_2\left(1 + \gamma_{D_{E_u}}\right)$$

represents the channel capacity of the eavesdropping channel, and the intercept probability that the eavesdropper intercepts a legitimate user's information is denoted as follows:

$$\begin{aligned} P_{int,n} &= P_r\left(C_{E_u} > R_u\right) \\ &= 1 - P_r\left(C_{E_u} \le R_u\right) \\ &= 1 - P_r\left(\gamma_{E_u} \le 2^{2R_u} - 1\right) \\ &= 1 - F_{\gamma_{E_u}}\left(2^{2R_u} - 1\right); \end{aligned} \tag{15}$$

3.3) the intercept probability when the eavesdropper intercepts the legitimate near user $D_n$:

$$\begin{aligned} P_{int,n} &= P_r\left(C_{E_n} > R_n\right) \\ &= 1 - P_r\left(C_{E_n} \le R_n\right) \\ &= 1 - F_{\gamma_{E_n}}\left(2^{2R_n} - 1\right); \end{aligned} \tag{16}$$

$$F_{\gamma_{E_n}}(x)$$

is expressed as:

$$\begin{aligned} F_{\gamma_{E_n}}(x) &= Pr\left\{\gamma_{E_n} \le x\right\} \\ &= Pr\left\{\frac{\alpha_n A_e^2}{A_e^2 \rho_{SE}^2 + \frac{d_B^\tau d_{R,e}^\tau}{\rho_E}} \le x\right\} \\ &= Pr\left\{A_e^2 \le \frac{d_B^\tau d_{R,e}^\tau x}{\rho_E\left(\alpha_n - x\rho_{SE}^2\right)}\right\} \\ &= F_{A_e}\left(\sqrt{\frac{d_B^\tau d_{R,e}^\tau x}{\rho_E\left(\alpha_n - x\rho_{SE}^2\right)}}\right) \end{aligned} \tag{17}$$

$F_{A_e}(x)$ represents a cumulative distribution function of $A_e$;

3.4) the intercept probability when the eavesdropper intercepts the legitimate remote user $D_m$:

$$\begin{aligned} P_{int,m} &= P_r\left(C_{E_m} > R_m\right) \\ &= 1 - P_r\left(C_{E_m} \le R_m\right) \\ &= 1 - F_{\gamma_{E_m}}\left(2^{2R_m} - 1\right) \end{aligned} \tag{18}$$

$$F_{\gamma_{E_m}}(x)$$

is expressed as:

$$\begin{aligned} F_{\gamma_{E_m}}(x) &= Pr\left\{\gamma_{E_m} \le x\right\} \\ &= Pr\left\{\frac{\alpha_m A_e^2}{A_e^2\left(\alpha_n + \rho_{SE}^2\right) + \frac{d_B^\tau d_{R,e}^\tau}{\rho_E}} \le x\right\} \\ &= Pr\left\{A_e^2 \le \frac{d_B^\tau d_{R,e}^\tau x}{\rho_E\left(\alpha_m - x\left(\alpha_n + \rho_{SE}^2\right)\right)}\right\} \\ &= F_{A_e}\left(\sqrt{\frac{d_B^\tau d_{R,e}^\tau x}{\rho_E\left(\alpha_m - x\left(\alpha_n + \rho_{SE}^2\right)\right)}}\right) \end{aligned} \tag{19}$$

$F_{A_e}(x)$ represents a cumulative distribution function of $A_e$;

4) transforming the calculation of the outage probability of the legitimate NOMA user and the intercept probability of the eavesdropper into solving a cumulative distribution function of equivalent channel coefficients of corresponding joint channels, whereby measuring physical layer secure transmission performance of the system, which is performed as follows:

given $$A_u = \sum_{i=1}^{N} |h_{si}|\left|g_{id_u}\right|, \text{ let } X_i = X_{i1}X_{i2} = |h_{si}|\left|g_{id_u}\right|, \text{ and } A_u = \sum_{i=1}^{N} X_i,$$

approximating PDF and CDF of $A_u$ as follows:

$$f_{A_u}(x) = a_1 G_{1,2}^{2,0}\left(\frac{x}{a_2}\,\middle|\, \begin{matrix} -; a_3 \\ a_4; a_5 \end{matrix}\right) \tag{20}$$

$$F_{A_u}(x) \approx a_1 a_2 G_{2,3}^{2,1}\left(\frac{x}{a_2}\,\middle|\, \begin{matrix} 1; a_3 + 1 \\ a_4 + 1; a_5 + 1; 0 \end{matrix}\right), x \ge 0 \tag{21}$$

$$a_1 = \frac{\Gamma(a_3 + 1)}{a_2 \Gamma(a_4 + 1)\Gamma(a_5 + 1)} \tag{22}$$

$$a_2 \frac{-a_3}{2}(\varphi_4 - 2\varphi_3 + \varphi_2) + 2\varphi_4 - 3\varphi_3 + \varphi_2 \tag{23}$$

$$a_3 = \frac{4\varphi_4 - 9\varphi_3 + 6\varphi_2 - \mu_1}{-\varphi_4 + 3\varphi_3 - 3\varphi_2 + \mu_1} \tag{24}$$

$$a_4 = \frac{a_6 + a_7}{2} \tag{25}$$

$$a_5 = \frac{a_6 - a_7}{2} \tag{26}$$

$$a_6 = \frac{a_3(\varphi_2 - \mu_1) + 2\varphi_2 - \mu_1}{a_2} - 3 \tag{27}$$

-continued $$a_7 = \sqrt{\left(\frac{a_3(\varphi_2 - \mu_1) + 2\varphi_2 - \mu_1}{a_2} - 1\right)^2 - 4\frac{\mu_1(a_3+1)}{a_2}} \tag{28}$$

$$\varphi_i = \frac{\mu_i}{\mu_{i-1}},\ i \ge 1 \tag{29}$$

$$\mu_1 = \sum_{i=1}^{N} \mu_1^{(i)} = N\mu_1^{(i)} \tag{30}$$

$$\begin{aligned} \mu_2 &= E\left[\left(\sum_{i=1}^{N} X_i\right)^2\right] + 2\sum_{i=1}^{N-1}\sum_{j=m+1}^{M} E[X_i]E[X_j] \\ &= N\mu_2^{(i)} + 2\binom{N}{2}E[X_i]E[X_j] \\ &= N\mu_2^{(i)} + N(N-1)\mu_1^{(i)}\mu_1^{(i)} \end{aligned} \tag{31}$$

where, E[•] represents expectation;

$$\begin{cases} N \ge 3, \\ \mu_3 = E\left[\left(\sum_{i=1}^{N} X_i\right)^3\right] = \sum_{i=1}^{N} E[X_i^3] + 3\sum_{i=1}^{N}\sum_{\substack{j=i \\ j\ne i}}^{N-1} E[X_i]E[X_j^2] + \\ \quad 6\sum_{i=1}^{N-2}\sum_{j=i+1}^{N-1}\sum_{k=j+1}^{N} E[X_i]E[X_j]E[X_k] = N\mu_3^{(i)} + \\ \quad 3N(N-1)\mu_1^{(i)}\mu_2^{(i)} + N(N-1)(N-2)\mu_1^{(i)}\mu_1^{(i)}\mu_1^{(i)} \\ N = 2, \\ \mu_3 = 2\mu_3^{(i)} + 3\times 2\mu_1^{(i)}\mu_2^{(i)} \\ N = 1, \\ \mu_3 = \mu_3^{(i)} \end{cases} \tag{32}$$

$$\begin{cases} N \ge 4, \\ \mu_4 = E\left[\left(\sum_{i=1}^{N} X_i\right)^4\right] = \sum_{i=1}^{N} E[X_i^4] + 6\sum_{i=1}^{N-1}\sum_{j=i+1}^{N} E[X_i^2X_j^2] + \\ \quad 4\sum_{i=1}^{N}\sum_{\substack{j=1 \\ j\ne i}}^{N} E[X_i^3X_j] + 12\sum_{i=1}^{N}\sum_{\substack{j=1 \\ j\ne i}}^{N}\sum_{\substack{k>j \\ k\ne i}}^{N} E[X_i^2X_jX_k] + \\ \quad 24\sum_{i<j<k<l} E[X_iX_jX_kX_l] = \\ \quad N\mu_4^{(i)} + 3N(N-1)\mu_2^{(i)}\mu_2^{(i)} + 4N(N-1)\mu_3^{(i)}\mu_1^{(i)} + \\ \quad 6N(N-1)(N-2)\mu_2^{(i)}\mu_1^{(i)}\mu_1^{(i)} + \\ \quad N(N-1)(N-2)(N-3)\mu_1^{(i)}\mu_1^{(i)}\mu_1^{(i)}\mu_1^{(i)} \quad ; \\ N = 3, \\ \mu_4 = 3\mu_4^{(i)} + 6\sum_{i=1}^{2}\sum_{j=i+1}^{3} E[X_i^2X_j^2] + 4\sum_{i=1}^{3}\sum_{j=1}^{3} E[X_i^3X_j] + \\ \quad 12\left(E[X_1^2X_2X_3] + E[X_2^2X_1X_3] + E[X_3^2X_1X_2]\right) = \\ \quad 3\mu_4^{(i)} + 24\mu_1^{(i)}\mu_3^{(i)} + 18\mu_2^{(i)}\mu_2^{(i)} + 36\mu_2^{(i)}\mu_1^{(i)}\mu_1^{(i)} \\ N = 2, \\ \mu_4 = 2\mu_4^{(i)} + 4\left(E[X_1]E[X_2^3] + E[X_2]E[X_1^3]\right) + \\ \quad 6E[X_1^2]E[X_2^2] = 2\mu_4^{(i)} + 8\mu_1^{(i)}\mu_3^{(i)} + 6\mu_2^{(i)}\mu_2^{(i)} \\ N = 1, \\ \mu_4 = \mu_4^{(i)} \end{cases} \tag{33}$$

to obtain $a_1$, $a_2$, $a_3$, $a_4$, first four moments of $\mu_l$ are calculated, and $\mu_l^{(i)}$ ($1 \le l \le 4$) of a variable $A_u$ is first calculated:

$$\mu_1^{(i)} = E[X_i] = E[X_{i1}X_{i2}] = E[|h_{si}||g_{id_k}|] = E[|h_{si}|]E[|g_{id_k}|] \tag{34}$$

$$\mu_2^{(i)} = E[X_i^2] = E[X_{i1}^2X_{i2}^2] = E[|h_{si}|^2|g_{id_k}|^2] = E[|h_{si}|^2]E[|g_{id_k}|^2] \tag{35}$$

-continued $$\mu_3^{(i)} = E[X_i^3] = E[X_{i1}^3X_{i2}^3] = E[|h_{si}|^3|g_{id_k}|^3] = E[|h_{si}|^3]E[|g_{id_k}|^3] \tag{36}$$

$$\mu_4^{(i)} = E[X_i^4] = E[X_{i1}^4X_{i2}^4] = E[|h_{si}|^4|g_{id_k}|^4] = E[|h_{si}|^4]E[|g_{id_k}|^4] \tag{37}$$

the $\mu_l^{(i)}$ ($1 \le l \le 4$) of a variable $A_u$ is calculated as follows: firstly, calculating the expectations of $X_{i1}$ and $X_{i2}$, and calculating the expectation of $f_{X_{i1}}(x)$ as follows:

$$\begin{aligned} E[|h_{si}|] &= E[|g_{id_k}|] \\ &= \int_0^\infty x f_{X_{i1}}(x)dx \\ &= \int_0^\infty x\frac{2\alpha^\alpha x^{2\alpha-1}}{R^{2\alpha}\Gamma(\alpha)}\exp\left(\frac{-x^2}{R^2}\alpha\right)dx \\ &= \frac{\alpha^\alpha\left(\frac{\alpha}{R^2}\right)^{-0.5-\alpha}R^{-2\alpha}\Gamma(0.5+\alpha)}{\Gamma(\alpha)} \end{aligned} \tag{38}$$

substituting formula (38) into formula (34), to yield:

$$\mu_1^{(i)} = \left(\frac{\alpha^\alpha\left(\frac{\alpha}{R^2}\right)^{-0.5-\alpha}R^{-2\alpha}\Gamma(0.5+\alpha)}{\Gamma(\alpha)}\right)^2 \tag{39}$$

parsing processes of $\mu_2^{(i)}$, $\mu_3^{(i)}$, $\mu_4^{(i)}$ are the same as that of $\mu_l^{(i)}$:

$$\mu_2^{(i)} = \left(\alpha^\alpha\left(\frac{\alpha}{R^2}\right)^{-\alpha}R^{2-2\alpha}\right)^2 \tag{40}$$

$$\mu_3^{(i)} = \left(\frac{\alpha^\alpha\left(\frac{\alpha}{R^2}\right)^{-1.5-\alpha}R^{-2\alpha}\Gamma(1.5+\alpha)}{\Gamma(\alpha)}\right)^2 \tag{41}$$

$$\mu_4^{(i)} = \left(\frac{\alpha^\alpha(1+\alpha)\left(\frac{\alpha}{R^2}\right)^{-2-\alpha}R^{-2\alpha}\Gamma(1+\alpha)}{\Gamma(\alpha)}\right)^2 \tag{42}$$

to obtain the outage probability of the legitimate NOMA user and the intercept probability when the eavesdropper intercepts the information $x_n$ and $x_m$:

$$\begin{aligned} P_{out,n} &= F_{A_n}\left(\sqrt{\frac{d_B^\tau d_{R,n}^\tau(2^{2R_n}-1)}{\rho_S(\alpha_n - x\rho_{SD_n}^2)}}\right) \\ &= a_1a_2G_{2,3}^{2,1}\left(\frac{\sqrt{\frac{d_B^\tau d_{R,n}^\tau(2^{2R_n}-1)}{\rho_S(\alpha_n-(2^{2R_n}-1)\rho_{SD_n}^2)}}}{a_2}\ \Big|_{a_4+1;a_5+1;0}^{1;a_3+1}\right) \end{aligned} \tag{43}$$

$$P_{out,m} = F_{A_m}\left(\sqrt{\frac{d_B^\tau d_{R,m}^\tau x}{\rho_S(\alpha_m - x(\alpha_n + \rho_{SD_m}^2))}}\right) \tag{44}$$

-continued $$= a_1 a_2 G_{2,3}^{2,1}\left( \frac{\sqrt{\frac{d_B^\tau d_{R,m}^\tau \left(2^{2R_m} - 1\right)}{\rho_S\left(\alpha_m - \left(2^{2R_m} - 1\right)\left(\alpha_n + \rho_{SD_m}^2\right)\right)}}}{a_2} \Big|_{a_4+1;a_5+1;0}^{1;a_3+1} \right)$$

$$\begin{aligned} P_{int,n} &= 1 - P_r\left(C_{E_n} \le R_n\right) \\ &= 1 - F_{\gamma_{E_n}}\left(2^{2R_n} - 1\right) \\ &= 1 - F_{A_e}\left(\sqrt{\frac{d_B^\tau d_{R,e}^\tau \left(2^{2R_n} - 1\right)}{\rho_E\left(\alpha_n - \left(2^{2R_n} - 1\right)\rho_{SE}^2\right)}}\right) \\ &= 1 - a_1 a_2 G_{2,3}^{2,1}\left( \frac{\sqrt{\frac{d_B^\tau d_{R,e}^\tau \left(2^{2R_n} - 1\right)}{\rho_E\left(\alpha_n - \left(2^{2R_n} - 1\right)\rho_{SE}^2\right)}}}{a_2} \Big|_{a_4+1;a_5+1;0}^{1;a_3+1} \right) \end{aligned} \tag{45}$$

$$\begin{aligned} P_{int,m} &= 1 - P_r\left(C_{E_m} \le R_m\right) \\ &= 1 - F_{\gamma_{E_m}}\left(2^{2R_m} - 1\right) \\ &= 1 - F_{A_e}\left(\sqrt{\frac{d_B^\tau d_{R,e}^\tau \left(2^{2R_m} - 1\right)}{\rho_E\left(\alpha_m - \left(2^{2R_m} - 1\right)\left(\alpha_n + \rho_{SE}^2\right)\right)}}\right) \\ &= 1 - a_1 a_2 G_{2,3}^{2,1}\left( \frac{\sqrt{\frac{d_B^\tau d_{R,e}^\tau \left(2^{2R_m} - 1\right)}{\rho_E\left(\alpha_m - \left(2^{2R_m} - 1\right)\left(\alpha_n + \rho_{SE}^2\right)\right)}}}{a_2} \Big|_{a_4+1;a_5+1;0}^{1;a_3+1} \right); \end{aligned} \tag{46}$$

thus completing secure transmission of the physical layer of the system.

Figure 3:
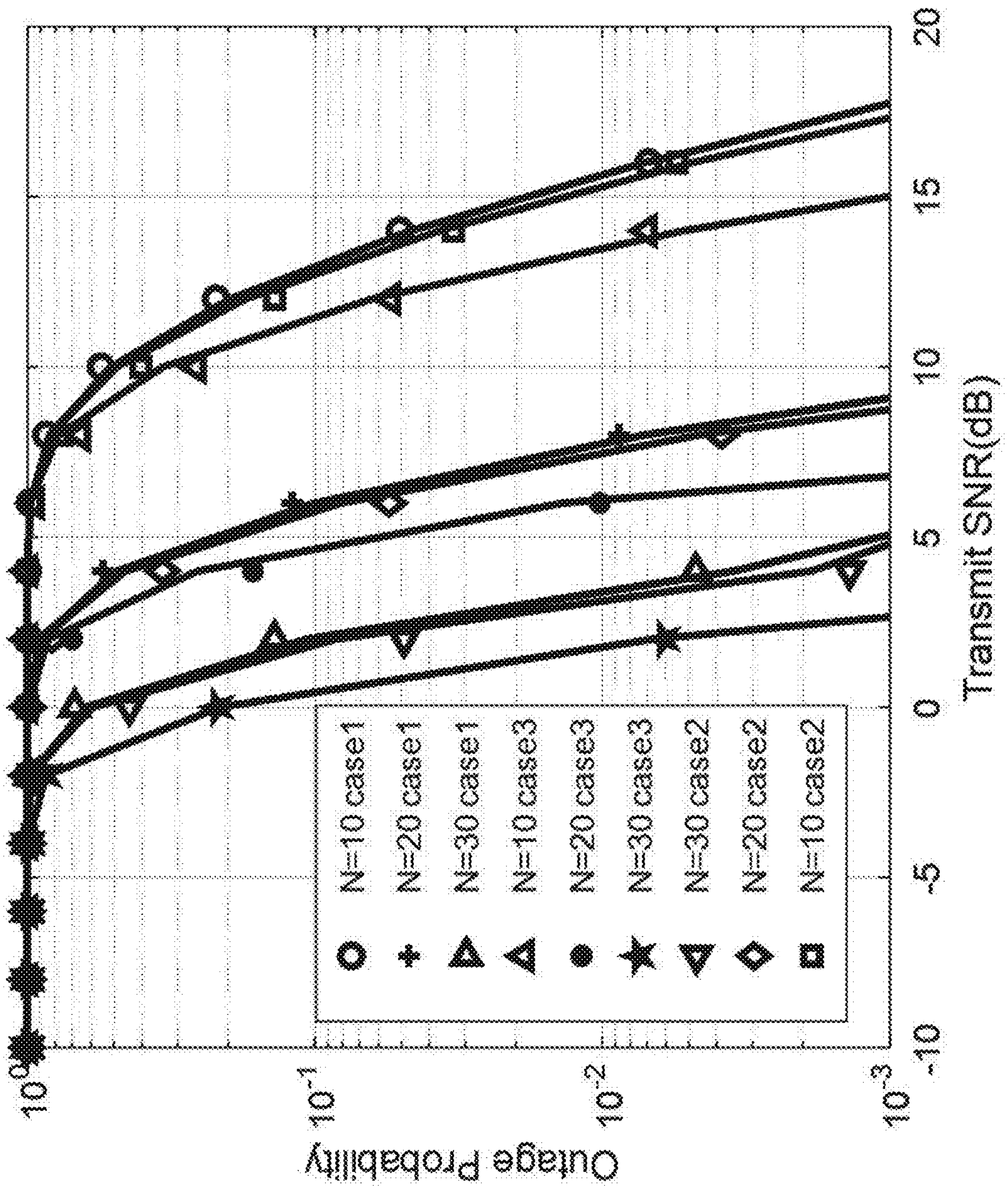
FIG. 3 shows a variation of OP with SNR when N and Case are different.

FIG. 3 shows a variation of outage probability (OP) of a legitimate near user $D_n$ under different RIS reflection unit numbers N.

To observe and understand the impact of the parameter k-μ, the user's outage probability under different Cases is simulated. Case1, Case2 and Case3 are corresponding Rayleigh fading, Rice shadow fading, and k-μ shadow fading when the parameter k-μ takes special values, respectively. The Monte Carlo curves match well with the mathematically derived analytical result curves in the whole range of signal-to-noise ratio, which verifies the correctness of the theoretical analysis. In addition, under the same Case, the outage probability decreases with the increase of the number of the smart reflective surface elements N, which indicates that increasing the number of the smart reflective surface elements can reduce the outage probability of the system; the outage probability of Case3 is lower than that of Case1 and Case2 under the same N, which suggests that the general k-μ shadow fading can effectively improve the reliability of the system.

Figure 4:
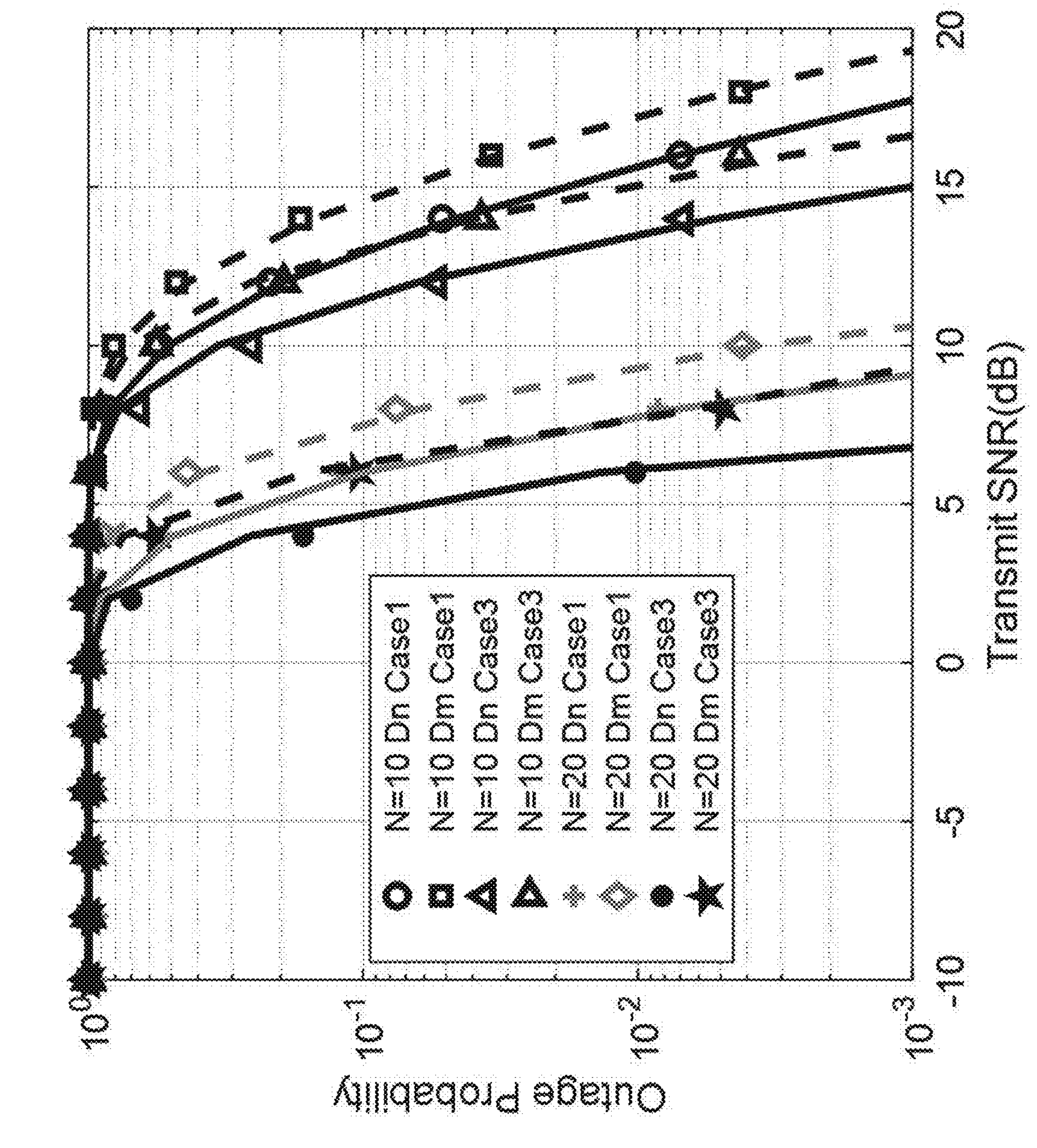
FIG. 4 shows OP of NOMA users $D_n$ and $D_m$.

To study the interruption performance of NOMA users, FIG. 4 shows a change trend of outage probability of near users $D_n$ and remote users $D_m$ with different $V_S$ transmit powers and different number N of RIS reflection units. Firstly, it can be seen that the analysis result of the outage probability is matched with the simulation, which indicates the correctness of the derivation of the formula for the outage probability; secondly, the user SINR increases with the increase of the transmit power, and the outage probability of all the users decreases with the increase of the $V_S$ transmit power; in addition, the outage probability of the near user is always lower than that of the remote user under different N and different cases, which means the former is more reliable. Particularly, it can also be observed that under the same Case, the user's outage probability significantly decreases as N increases, which indicates that increasing the number of reflection units of the smart reflective surface can effectively improve the reliability of the system. Meanwhile, the outage probability of Case3 is lower than the outage probability of Case1 when N is constant, which indicates that general k-μ shadow fading can effectively reduce the outage probability of the system compared to Rayleigh fading.

Figure 5:
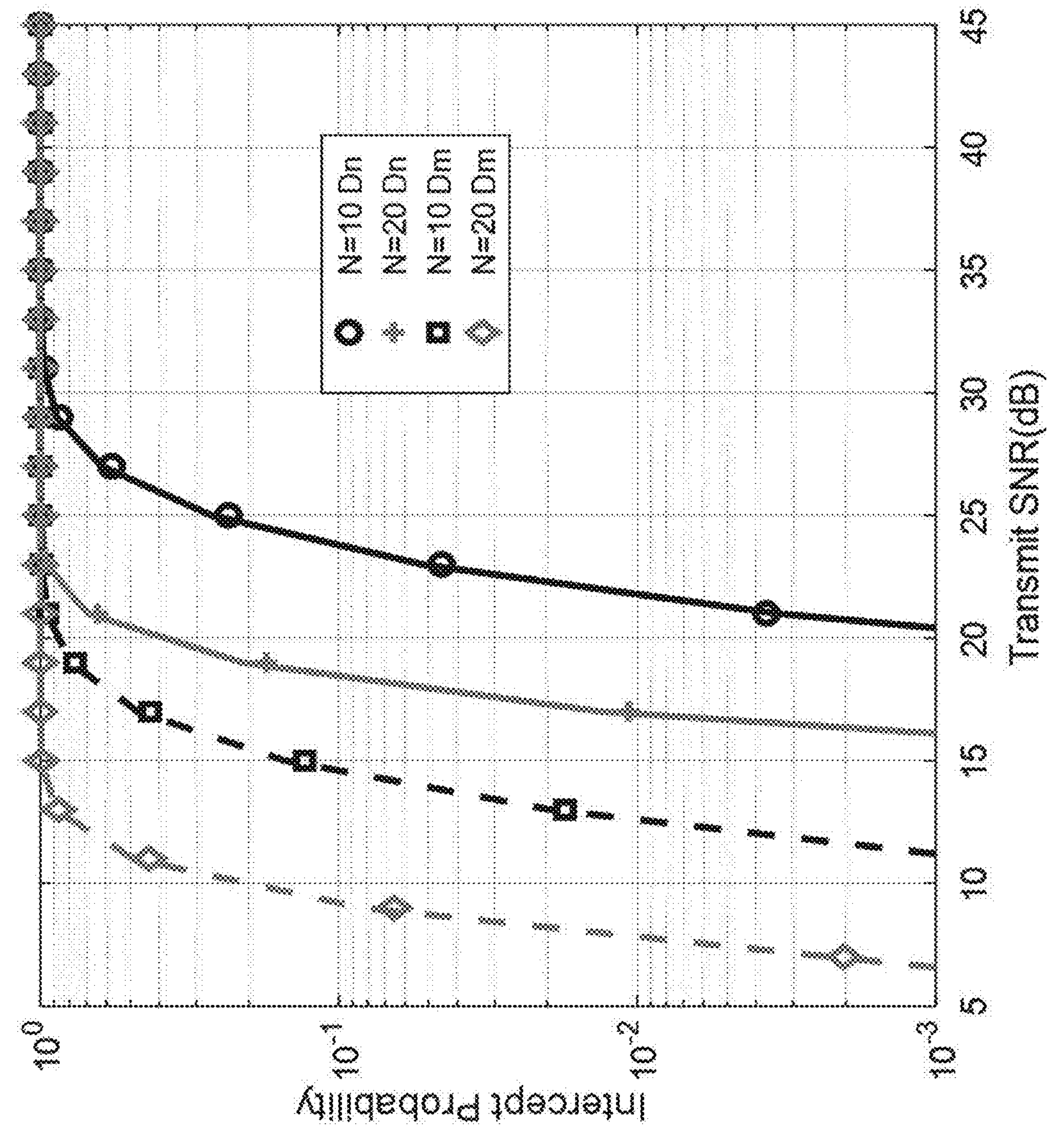
FIG. 5 shows IP of NOMA users $D_n$ and $D_m$.

FIG. 5 shows a change trend of interrupt probability of near users $D_n$ and remote users $D_m$ with different $V_S$ transmit powers and different number N of RIS reflection units. The analysis result of the interrupt probability is matched with the simulation, which indicates the correctness of the derivation of the formula for the interrupt probability. The intercept probability of all users increases with the increase of $V_S$ transmitting power, and when N is constant, the intercept probability of the near user is always lower than that of the remote user, and the security is stronger. As N increases, the intercept probability also increases and the system security performance decreases. This indicates that the increase of the number of different RIS reflection units will decrease the outage probability, increase the security, increase the interrupt probability, and decrease the reliability of the system. At this point, there is a trade-off between the security and reliability of the system.

Figure 6:
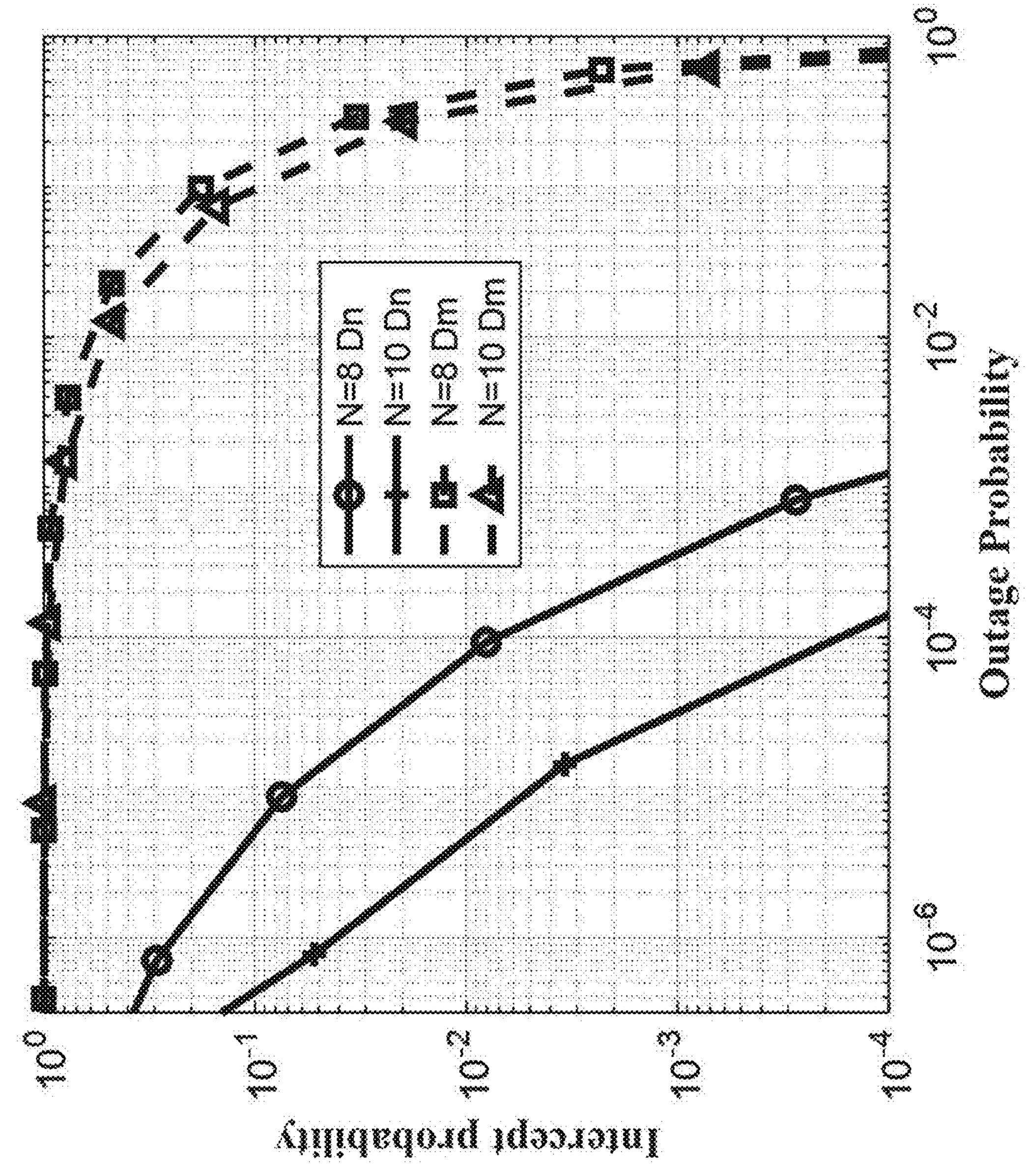
FIG. 6 shows a variation of intercept probability with outage probability under different N.

To further investigate the relationship between the outage probability and the intercept probability of the system, FIG. 6 shows the effect of outage probability on the intercept probability at different numbers N of the RIS reflection units. The results show that as the outage probability gradually increases, the intercept probability decreases and vice versa, which implies that there is a trade-off between the outage probability and the intercept probability, and between the security and reliability of the system. As the number N increases, the compromise between the security and reliability decreases. Because NOMA users adopt SIC technology, the impact of the number N on SINR of $D_n$ is greater and the change of $D_n$ is more significant. By increasing the number of the reflective units of RIS, the trade-off between the system security and reliability can be improved. Specifically, it can be observed that when the outage probability is the same, the intercept probability of $D_n$ is less than that of $D_m$; when the intercept probability is the same, the outage probability of $D_n$ is less than that of $D_m$, which means $D_n$ has higher safety and reliability performance, and the advantage becomes more obvious with the increase of N.

Figure 7:
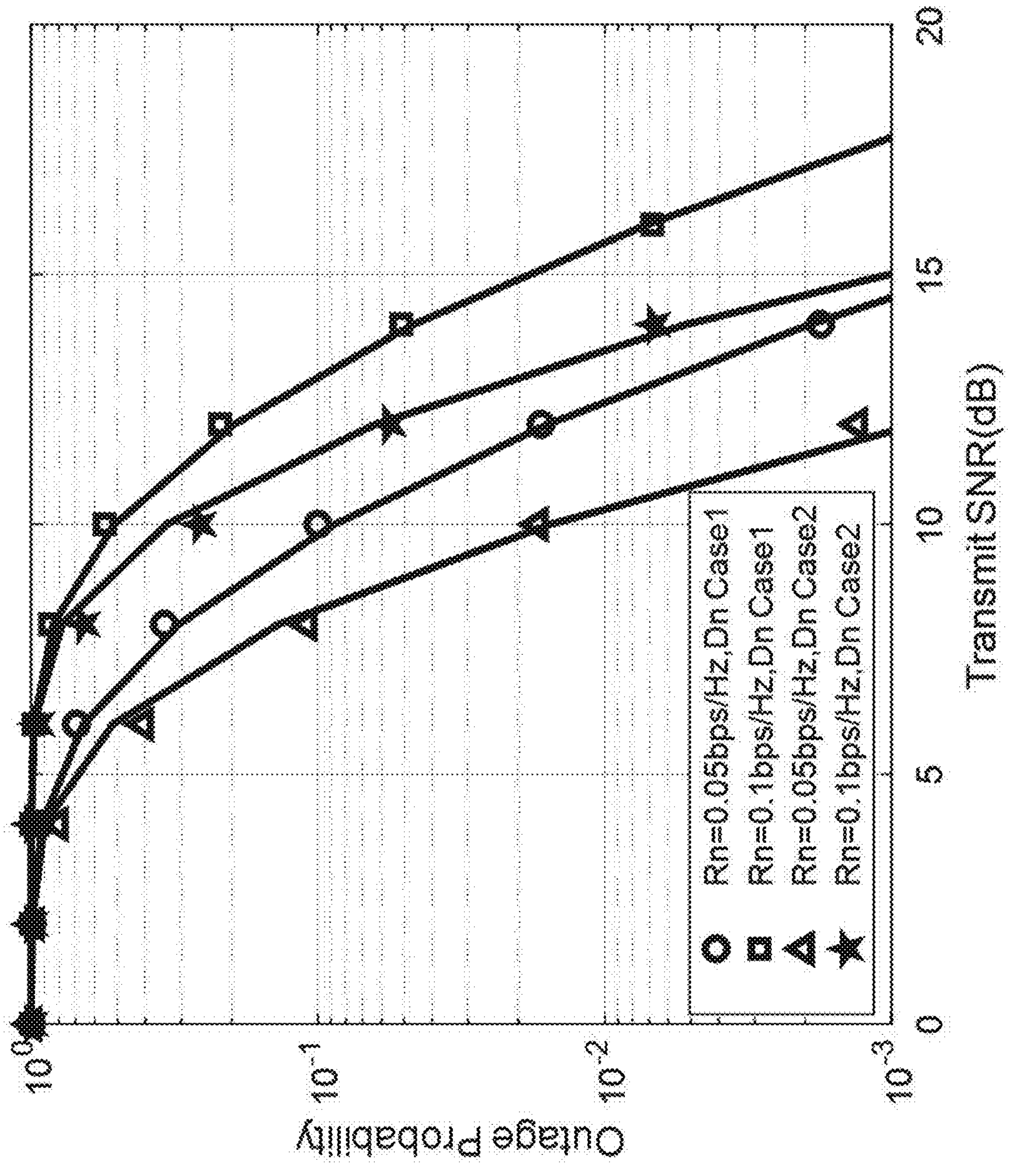
FIG. 7 shows a variation of OP with signal-to-noise ratio at different cases and different $R_n$.

FIG. 7 shows the effect of $R_n$ of different Case on the outage probability of users. The results show that the target data rate affects the system security performance. At the same Case, the system outage probability decreases as $R_n$ decreases; when $R_n$ is a fixed value, the outage probability of Case2 is smaller than the outage probability of Case1, which shows the superiority of general k-μ shadow fading. Therefore, the performance of the system can be improved by reducing the target rate and adopting more complex and realistic k-μ shadow fading.

Figure 8:
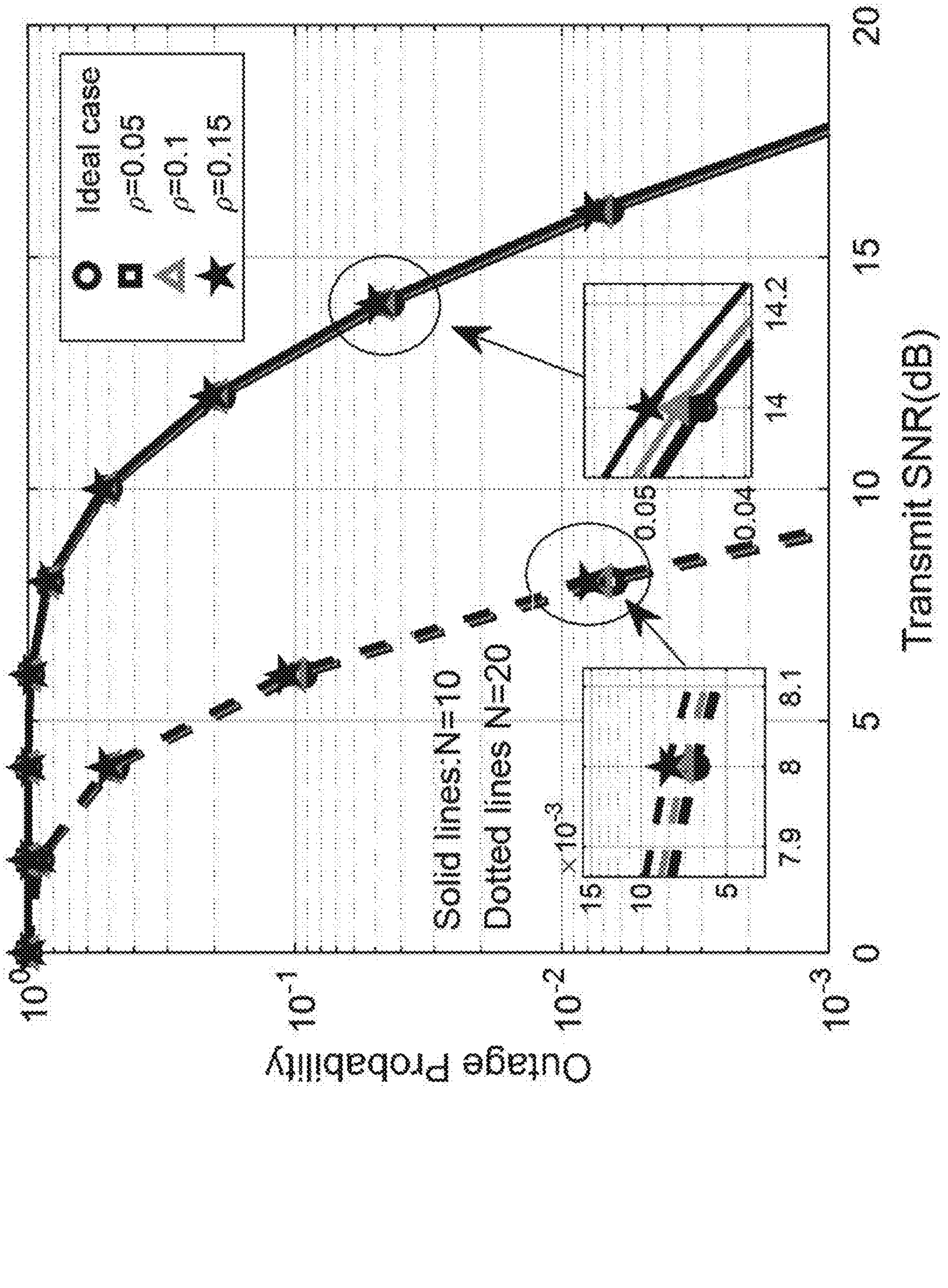
FIG. 8 shows a variation of OP with signal-to-noise ratio when different ρ and N.

FIG. 8 shows the impact of RHI on the system performance at different N. To compare the effect of RHI on the outage probability, a curve for the ideal case ρ=0 is drawn as a comparison. In the ideal case, both the transmitter and receiver are not affected by hardware corruption, and the outage probability is the lowest. As shown in the figure, the presence of RHI decreases the outage probability of the E-RHI-RIS-NOMA system, and the outage probability increases gradually with the increase of ρ.

Figure 9:
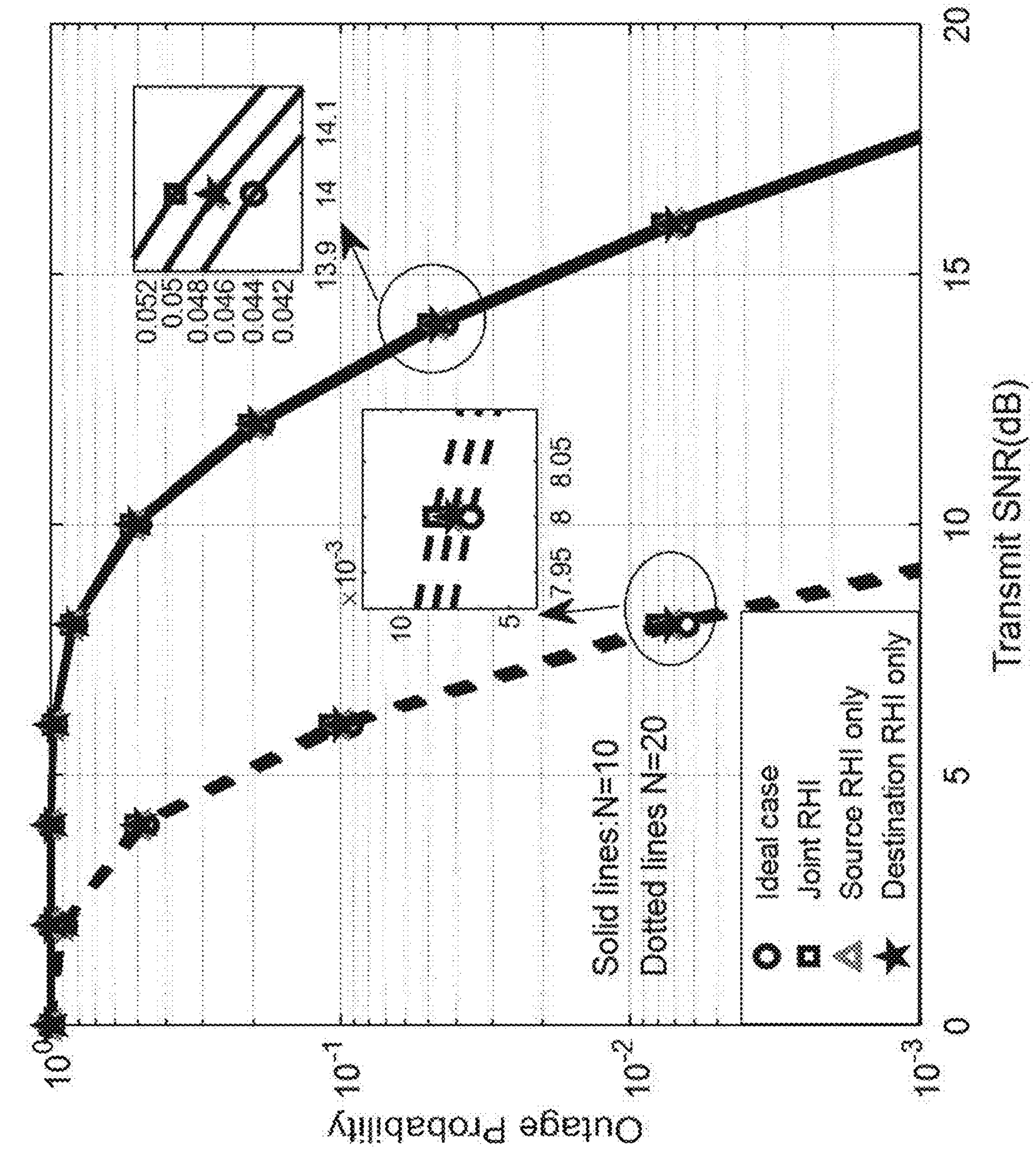
FIG. 9 shows a variation of OP with signal-to-noise ratio when RHI is located at different nodes.
Figure 10:
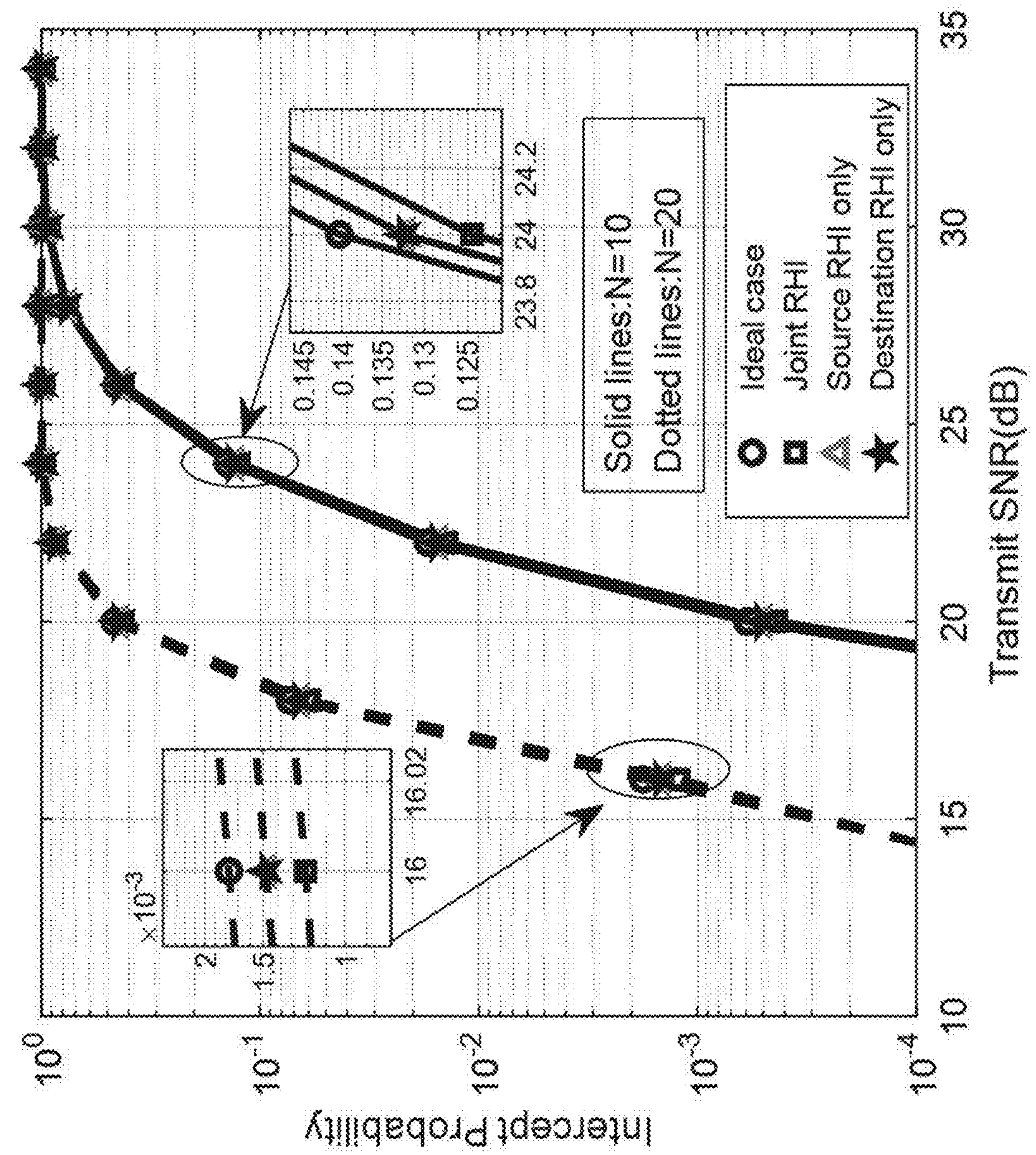
FIG. 10 shows a variation of IP with signal-to-noise ratio when RHI is located at different nodes.

FIG. 9 shows the variation of the outage probability of users $D_n$ when RHI exists at different nodes. As shown in the figure, when RHI only occurs in the destination node and the eavesdropping node, the impact on the reliability performance of the system is smaller than that in the case of joint RHI, and it can also be observed that the outage probability of the system decreases significantly with the increase of N. FIG. 10 shows the variation of the user's intercept probability in the presence of RHI at different nodes. The impact on the system security performance when RHI occurs only at the destination and eavesdropping nodes is greater than that in the case of a joint RHI, and the system's intercept probability increase significantly with increasing N. This suggests that the accurate modeling of the hardware defects of the transmitter and receiver is necessary when evaluating the performance of RIS-assisted NOMA systems.

Figure 11:
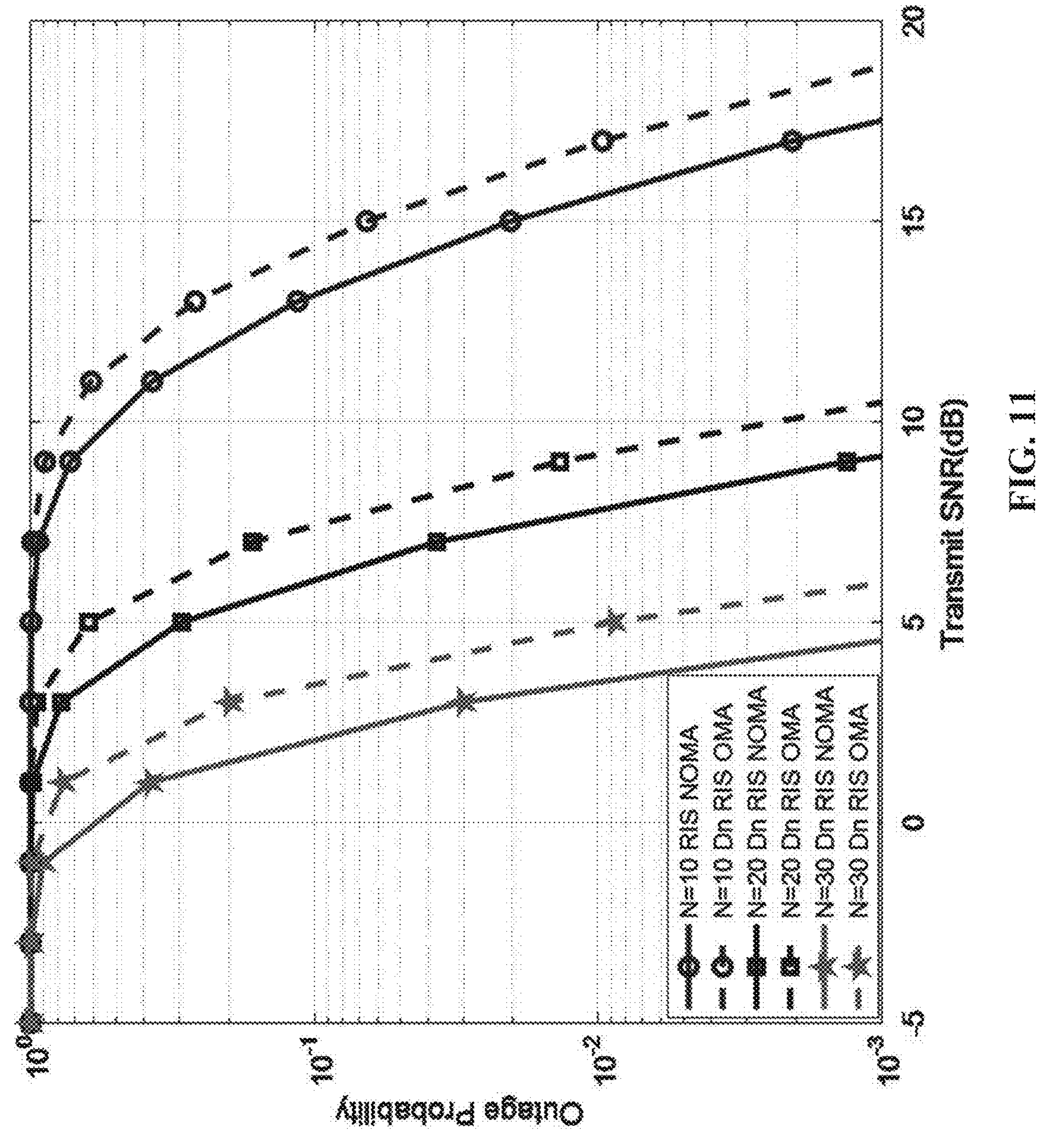
FIG. 11 is a comparison of outage probabilities of NOMA and OMA under different N conditions.
Figure 12:
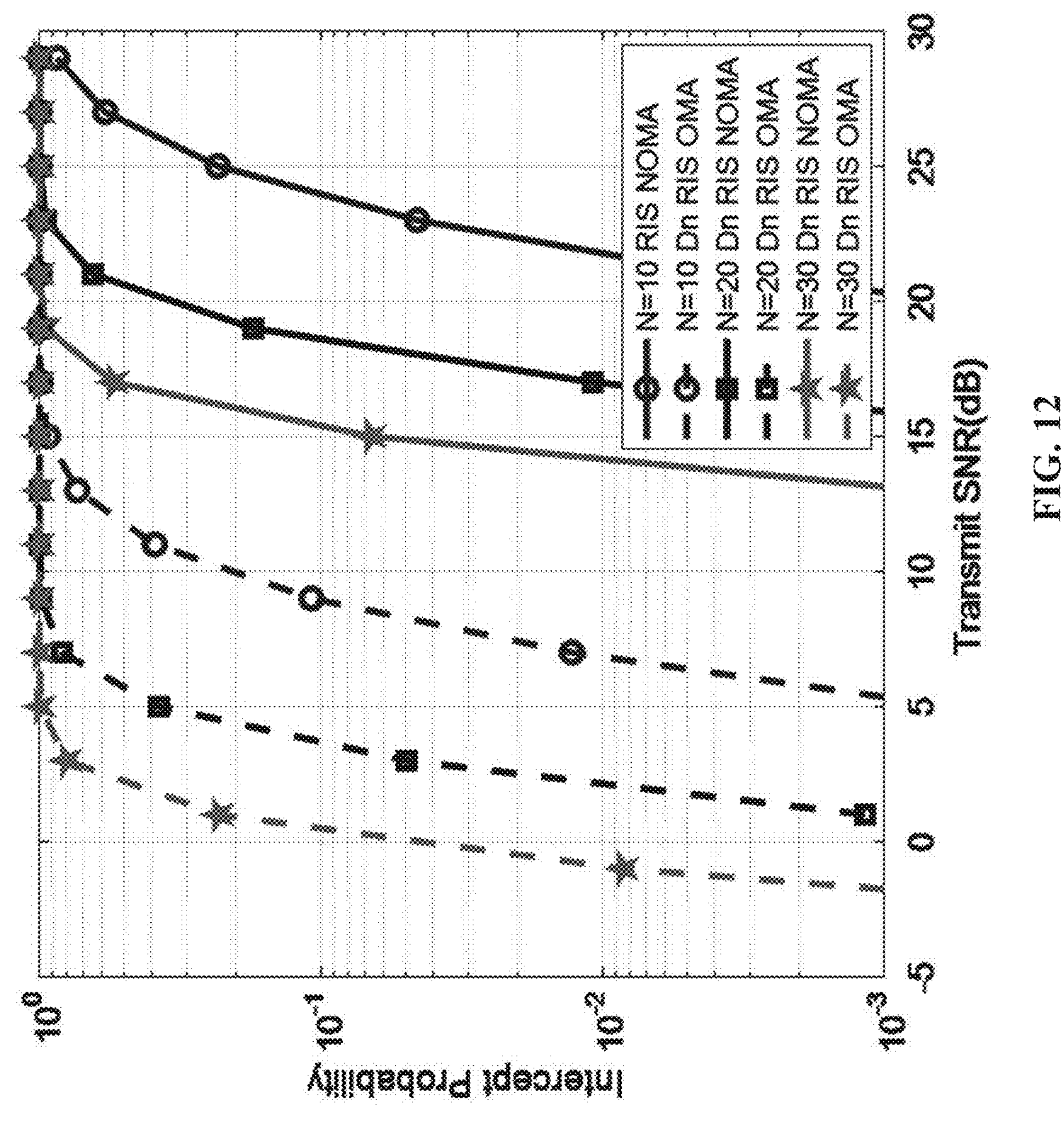
FIG. 12 is a comparison of intercept probabilities of NOMA and OMA under different N conditions.

As shown in FIG. 11, it can be seen that when N is the same, the outage probability of RIS assisted NOMA system is lower than that of RIS assisted OMA system, indicating the former has stronger reliability. As N increases, the outage probability of both systems gradually decreases. To comprehensively compare the intercept performance of NOMA and OMA systems under different N, as shown in FIG. 12, the intercept probability of RIS assisted NOMA system is lower than that of RIS assisted OMA system, indicating the former has stronger security. As N increases, the intercept probability of both systems gradually increases. Therefore, reasonable deployment of RIS can effectively improve the security and reliability of the OMA and NOMA systems, and RIS assisted NOMA systems are much more advantageous.

It will be obvious to those skilled in the art that changes and modifications may be made, and therefore, the aim in the appended claims is to cover all such changes and modifications.

What is claimed is:

1. A wireless secure communication method using reconfigurable intelligent surface-non-orthogonal multiple access (RIS-NOMA) under complex channel conditions, wherein the RIS-NOMA refers to a RIS-NOMA communication system comprises:

a base station (BS), a reconfigurable intelligent surface (RIS), a legitimate NOMA user, and an eavesdropper (Eve);

the legitimate NOMA user comprises a legitimate remote user $D_m$ and a legitimate near user $D_n$, and the base station communicates with the RIS; the RIS communicates with the legitimate NOMA user; the Eve intercepts a signal transmitted by the RIS; an arbitrary channel link obeys κ-μ shadow fading; each node in the RIS-NOMA communication system encounters a residual hardware impairment (RHI);

the method comprising:

1) calculating a signal to interference plus distortion noise ratio (SIDNR) for the legitimate NOMA user and the eavesdropper in the presence of RHI in the RIS-NOMA communication system;

2) approximating a probability density function and cumulative distribution function for the κ-μ shadow fading;

3) calculating an outage probability of the legitimate NOMA user and an intercept probability of the eavesdropper; and 4) Transforming a calculation of the outage probability of the legitimate NOMA user and the intercept probability of the eavesdropper into solving a cumulative distribution function of equivalent channel coefficients of corresponding joint channels, whereby measuring physical layer secure transmission performance of the system;

wherein: 1) is performed as follows:

defining a channel coefficient from the base station to an ith RIS reflecting surface in the system as $h_{si}$, and channel coefficients from the RIS to the legitimate NOMA user and to the eavesdropper as $g_{id_u}$, $u\in(n,m)$ and $g_{ie}$, respectively;

when the legitimate near user $D_n$ detects a weak signal $x_m$, the signal to interference plus distortion to noise ratio SIDNR is expressed as:

$$\gamma_{D_n\to D_m}=\frac{\alpha_m A_n^2}{A_n^2(\alpha_n+\rho_{SD_n}^2)+\frac{d_B^\tau d_{R,n}^\tau}{\rho_S}}; \tag{1}$$

wherein, $\alpha_m$ and $\alpha_n$ represent power distribution coefficients of the legitimate remote user $D_m$ and the legitimate near user $D_n$, respectively, and $$\alpha_n<\alpha_m,$$

$$\alpha_m+\alpha_n=1;$$

$$\rho_S=\frac{P_S}{\sigma_D^2}$$

represents an average signal-to-noise ratio of a legal link, Ps is a transmit power of BS, and is an additive white Gaussian noise channel variance; $\rho_{SD_n}$ represents an overall RHI level of a link BS→$D_n$;

$$A_n=\sum_{i=1}^{N}|h_{si}|\,|g_{d_n}|$$

represents a joint channel coefficient of the link BS→$D_n$; $h_{si}$ is a channel coefficient of a link BS→RIS; $g_{id_n}$ is a channel coefficient of a link RIS→$D_n$; |•| represents modeling; $d_B$ and $d_{R,n}$ represent a distance from the base station to the RIS and a distance from the RIS to the legitimate near user $D_n$, respectively; and τ represents a path fading index;

through successive interference cancellation (SIC) technology, the SIDNR of $D_n$ decoding its own signal is given by the following equation:

$$\gamma_{D_n}=\frac{\alpha_n A_n^2}{A_n^2\rho_{SD_n}^2+\frac{d_B^\tau d_{R,n}^\tau}{\rho_S}}; \tag{2}$$

when $D_m$ decodes its own signal, a signal $x_n$ with strong channel gain is considered as noise, and SIDNR is represented as follows:

$$\gamma_{D_m}=\frac{\alpha_m A_m^2}{A_m^2(\alpha_n+\rho_{SD_m}^2)+\frac{d_B^\tau d_{R,m}^\tau}{\rho_S}}; \tag{3}$$

wherein $$A_m = \sum_{i=1}^{N} |h_{si}| \left|g_{id_m}\right|; g_{id_m}$$

is a channel coefficient of a link RIS→$D_m$;

when the eavesdropper intercepts the signals $x_n$ and $x_m$ respectively, the obtained SIDNR is expressed as follows:

$$\gamma_{E_n} = \frac{\alpha_n A_e^2}{A_e^2 \rho_{SE}^2 + \frac{d_B^\tau d_{R,e}^\tau}{\rho_E}} \quad (4)$$

$$\gamma_{E_m} = \frac{\alpha_m A_e^2}{A_e^2\left(\alpha_n + \rho_{SE}^2\right) + \frac{d_B^\tau d_{R,e}^\tau}{\rho_E}} \quad (5)$$

$$\rho_E = \frac{P_S}{\sigma_E^2}$$

represents SNR of an eavesdropping link;

$$A_e = \sum_{i=1}^{N} |h_{si}| \, |g_{ie}|;$$

$g_{ie}$ represents a joint channel coefficient of a link $$RIS \to Eve; \sigma_E^2$$

represents an additive white Gaussian noise channel variance of the eavesdropper; $\rho_{SE}$ represents an overall RHI level of a link BS→Eve; and $d_{R,e}$ represents a distance from the RIS to the eavesdropper; and 2) is performed as follows:

SIDNR of the legitimate NOMA user and the eavesdropper contains $$A_u = \sum_{i=1}^{N} |h_{si}| \left|g_{d_{iu}}\right|, u \in (n, m) \text{ and } A_e = \sum_{i=1}^{N} |h_{si}| \, |g_{ie}|$$

as equivalent channel coefficients for corresponding joint channels;

assuming that envelopes $|h_{si}|$, $|g_{id_u}|$, u∈(n,m) and $|g_{ie}|$ of all instantaneous channel coefficients are subject to independent and identically distributed k-μ shadow fading, and X represents the envelopes $|h_{si}|$, $|g_{id_u}|$, u∈(n,m) and $|g_{ie}|$ of instantaneous channel coefficients, the cumulative distribution functions and probability density functions thereof are represented as follows:

$$F_X(x) = \frac{\mu^{\mu-1} m^m (1+k)^\mu}{\Gamma(\mu)(\mu k+m)^m}\left(\frac{1}{R}\right)^{2\mu} x^{2\mu}\Phi_2\left(\mu-m, m, \mu+1; -\frac{\mu(1+k)x^2}{R^2}, -\frac{\mu(1+k)}{R^2}\frac{mx^2}{\mu k+m}\right) \quad (6)$$

$$f_X(x) = \frac{2\mu^\mu m^m (1+k)^\mu}{\Gamma(\mu)(\mu k+m)^m}\left(\frac{1}{R^{2\mu}}\right)x^{2\mu-1} \exp\left(-\frac{\mu(1+k)}{R^2}x^2\right)_1 F_1\left(m, \mu; \frac{\mu^2 k(1+k)}{(\mu k+m)R^2}x^2\right) = \frac{2a^\mu}{\Gamma(\mu)b^m}x^{2\mu-1}\exp(-ax)_1F_1\left(m, \mu; \frac{\mu^2 k(1+k)}{(\mu k+m)R^2}x^2\right) \quad (7)$$

Γ(•), $\Phi_2$(•) and $_1F_1$(•) are defined as a Gamma function, binary confluence hypergeometric function, and confluence hypergeometric function, respectively;

$$a = \frac{\mu(1+k)}{\Omega},$$

$$b = \frac{\mu k + m}{m};$$

k is a ratio of a total power of dispersed components to dominant sight components, μ is a total number of multipath clusters, m is a fading degree parameter, and R is an average power of the channel;

to simplify calculation, the cumulative distribution function and probability density function of the k-μ shadow distribution are approximated as follows:

$$F_X(x) \approx \left(\frac{\alpha^\alpha x^{2\alpha}}{\Gamma(\alpha+1)R^{2\alpha}}\right)_1 F_1\left(\alpha, \alpha+1, \frac{-x^2\alpha}{R^2}\right) \quad (8)$$

$$f_X(x) \approx \frac{2\alpha^\alpha x^{2\alpha-1}}{R^{2\alpha}\Gamma(\alpha)}\exp\left(\frac{-x^2}{R^2}\alpha\right); \quad (9)$$

and $$\alpha = \frac{m\mu(1+k)^2}{m + \mu k^2 + 2mk}.$$

2. The method of claim 1, wherein in 3), the outage probability of the legitimate NOMA user is calculated as follows:

when a channel capacity of a main channel is less than a set threshold $R_u$, and u∈(n,m), an interrupt event occurs; $C_u = \frac{1}{2}\log_2(1+\gamma_{D_u})$ represents the channel capacity of the main channel, and the outage probability of a legitimate NOMA user $D_u$ is expressed as follows:

$$P_{out,n} = Pr\{C_u \le R_u\} = Pr\left\{\gamma_{D_u} \le 2^{2R_u} - 1\right\} = F_{\gamma_{D_u}}\left(2^{2R_u} - 1\right) \quad (10)$$

3.1) the outage probability of the legitimate near user $D_n$:

$$\begin{aligned} P_{out,n} &= Pr\{C_n \le R_n\} \\ &= F_{\gamma_{D_n}}(2^{2R_n}-1); \end{aligned} \tag{11}$$

$$F_{\gamma_{D_n}}(x)$$

is expressed as:

$$\begin{aligned} F_{\gamma_{D_n}}(x) &= Pr\{\gamma_{D_n} \le x\} \\ &= Pr\left\{\frac{\alpha_n A_n^2}{A_n^2\rho_{SD_n}^2 + \frac{d_B^\tau d_{R,n}^\tau}{\rho_S}} \le x\right\} \\ &= Pr\left\{A_n^2 \le \frac{d_B^\tau d_{R,n}^\tau x}{\rho_S(\alpha_n - x\rho_{SD_n}^2)}\right\} \\ &= F_{A_n}\left(\sqrt{\frac{d_B^\tau d_{R,n}^\tau x}{\rho_S(\alpha_n - x\rho_{SD_n}^2)}}\right) \end{aligned} \tag{12}$$

$F_{A_n}(x)$ represents a cumulative distribution function of $A_n$;

3.2) the outage probability of the legitimate remote user $D_m$:

$$\begin{aligned} P_{out,m} &= Pr\{C_m \le R_m\} \\ &= F_{\gamma_{D_m}}(2^{2R_m}-1) \end{aligned} \tag{13}$$

$$F_{\gamma_{D_m}}(x)$$

is expressed as:

$$\begin{aligned} F_{\gamma_{D_m}}(x) &= Pr\{\gamma_{D_m} \le x\} \\ &= Pr\left\{\frac{\alpha_m A_m^2}{A_m^2(\alpha_n + \rho_{SD_m}^2) + \frac{d_B^\tau d_{R,m}^\tau}{\rho_S}} \le x\right\} \\ &= Pr\left\{A_m^2 \le \frac{d_B^\tau d_{R,m}^\tau x}{\rho_S(\alpha_m - x(\alpha_n + \rho_{SD_m}^2))}\right\} \\ &= F_{A_m}\left(\sqrt{\frac{d_B^\tau d_{R,m}^\tau x}{\rho_S(\alpha_m - x(\alpha_n + \rho_{SD_m}^2))}}\right) \end{aligned} \tag{14}$$

$F_{A_m}(x)$ represents a cumulative distribution function of $A_m$.

3. The method of claim 2, wherein in 3), the intercept probability of the eavesdropper is calculated as follows:

when a channel capacity of an eavesdropping channel is greater than a transmission rate, an interception event occurs;

$$C_{E_u} = \frac{1}{2}\log_2(1 + \gamma_{D_{E_u}})$$

represents the channel capacity of the eavesdropping channel, and the intercept probability that the eavesdropper intercepts a legitimate user's information is denoted as follows:

$$\begin{aligned} P_{int,n} &= P_r(C_{E_u} > R_u) \\ &= 1 - P_r(C_{E_u} \le R_u) \\ &= 1 - P_r(\gamma_{E_u} \le 2^{2R_u} - 1) \\ &= 1 - F_{\gamma_{E_u}}(2^{2R_u} - 1); \end{aligned} \tag{15}$$

3.3) the intercept probability when the eavesdropper intercepts the legitimate near user $D_n$:

$$\begin{aligned} P_{int,n} &= P_r(C_{E_n} > R_n) \\ &= 1 - P_r(C_{E_n} \le R_n) \\ &= 1 - F_{\gamma_{E_n}}(2^{2R_n} - 1); \end{aligned} \tag{16}$$

$$F_{\gamma_{E_n}}(x)$$

is expressed as:

$$\begin{aligned} F_{\gamma_{E_n}}(x) &= Pr\{\gamma_{E_n} \le x\} \\ &= Pr\left\{\frac{\alpha_n A_e^2}{A_e^2\rho_{SE}^2 + \frac{d_B^\tau d_{R,e}^\tau}{\rho_E}} \le x\right\} \\ &= Pr\left\{A_e^2 \le \frac{d_B^\tau d_{R,e}^\tau x}{\rho_E(\alpha_n - x\rho_{SE}^2)}\right\} \\ &= F_{A_e}\left(\sqrt{\frac{d_B^\tau d_{R,e}^\tau x}{\rho_E(\alpha_n - x\rho_{SE}^2)}}\right) \end{aligned} \tag{17}$$

$F_{A_e}(x)$ represents a cumulative distribution function of $A_e$;

3.4) the intercept probability when the eavesdropper intercepts the legitimate remote user $D_m$:

$$\begin{aligned} P_{int,m} &= P_r(C_{E_m} > R_m) \\ &= 1 - P_r(C_{E_m} \le R_m) \\ &= 1 - F_{\gamma_{E_m}}(2^{2R_m} - 1) \end{aligned} \tag{18}$$

$$F_{\gamma_{E_m}}(x)$$

is expressed as:

$$\begin{aligned} F_{\gamma_{E_m}}(x) &= Pr\{\gamma_{E_m} \le x\} \\ &= Pr\left\{\frac{\alpha_m A_e^2}{A_e^2(\alpha_n + \rho_{SE}^2) + \frac{d_B^\tau d_{R,e}^\tau}{\rho_E}} \le x\right\} \end{aligned} \tag{19}$$

-continued $$= Pr\left\{A_e^2 \le \frac{d_B^{\tau} d_{R,e}^{\tau} x}{\rho_E\left(\alpha_m - x\left(\alpha_n + \rho_{SE}^2\right)\right)}\right\}$$

$$= F_{A_e}\left(\sqrt{\frac{d_B^{\tau} d_{R,e}^{\tau} x}{\rho_S\left(\alpha_m - x\left(\alpha_n + \rho_{SE}^2\right)\right)}}\right)$$

$F_{A_e}(x)$ represents a cumulative distribution function of $A_e$.

4. The method of claim 3, wherein 4) is performed as follows:

given $$A_u = \sum_{i=1}^{N} |h_{si}|\,|g_{id_u}|, \text{ let } X_i = X_{i1} X_{i2} = |h_{si}|\,|g_{id_u}|, \text{ and } A_u = \sum_{o=1}^{N} X_i,$$

approximating probability density function (PDF) and cumulative distribution function (CDF) of $A_u$ as follows:

$$f_{A_u}(x) = a_1 G_{1,2}^{2,0}\left(\frac{x}{a_2} \,\middle|\, \begin{matrix} -;\, a_3 \\ a_4;\, a_5 \end{matrix}\right) \tag{20}$$

$$F_{A_u}(x) \approx a_1 a_2 G_{2,3}^{2,1}\left(\frac{x}{a_2} \,\middle|\, \begin{matrix} 1;\, a_3+1 \\ a_4+1;\, a_5+1;\, 0 \end{matrix}\right),\ x \ge 0 \tag{21}$$

$$a_1 = \frac{\Gamma(a_3+1)}{a_2 \Gamma(a_4+1)\Gamma(a_5+1)} \tag{22}$$

$$a_2 = \frac{a_3}{2}(\varphi_4 - 2\varphi_3 + \varphi_2) + 2\varphi_4 - 3\varphi_3 + \varphi_2 \tag{23}$$

$$a_3 = \frac{4\varphi_4 - 9\varphi_3 + 6\varphi_2 - \mu_1}{-\varphi_4 + 3\varphi_3 - 3\varphi_2 + \mu_1} \tag{24}$$

$$a_4 = \frac{a_6 + a_7}{2} \tag{25}$$

$$a_5 = \frac{a_6 - a_7}{2} \tag{26}$$

$$a_6 = \frac{a_3(\varphi_2 - \mu_1) + 2\varphi_2 - \mu_1}{a_2} - 3 \tag{27}$$

$$a_7 = \sqrt{\left(\frac{a_3(\varphi_2 - \mu_1) + 2\varphi_2 - \mu_1}{a_2} - 1\right)^2 - 4\frac{\mu_1(a_3+1)}{a_2}} \tag{28}$$

$$\varphi_i = \frac{\mu_i}{\mu_{i-1}},\ i \ge 1 \tag{29}$$

$$\mu_1 = \sum_{i=1}^{N} \mu_1^{(i)} = N\mu_1^{(i)} \tag{30}$$

$$\begin{aligned} \mu_2 &= E\left[\left(\sum_{i=1}^{N} X_i\right)^2\right] + 2\sum_{i=1}^{N-1}\sum_{j=m+1}^{M} E[X_i]E[X_j] \\ &= N\mu_2^{(i)} + 2\binom{N}{2} E[X_i]E[X_j] \\ &= N\mu_2^{(i)} + N(N-1)\mu_1^{(i)}\mu_1^{(i)} \end{aligned} \tag{31}$$

where, E[•] represents expectation;

$$\begin{cases} N \ge 3, \\ \mu_3 = E\left[\left(\sum_{i=1}^{N} X_i\right)^3\right] = \sum_{i=1}^{N} E\left[X_i^3\right] + \\ 3\sum_{i=1}^{N}\sum_{\substack{j=1 \\ j \ne i}}^{N} E[X_i]E\left[X_j^2\right] + 6\sum_{i=1}^{N-2}\sum_{j=i+1}^{N-1}\sum_{k=j+1}^{N} E[X_i]E[X_j]E[X_k] = \\ N\mu_3^{(i)} + 3N(N-1)\mu_1^{(i)}\mu_2^{(i)} + N(N-1)(N-2)\mu_1^{(i)}\mu_1^{(i)}\mu_1^{(i)} \\ N = 2, \\ \mu_3 = 2\mu_3^{(i)} + 3 \times 2\mu_1^{(i)}\mu_2^{(i)} \\ N = 1, \\ \mu_3 = \mu_3^{(i)} \end{cases} \tag{32}$$

$$\begin{cases} N \ge 4, \\ \mu_4 = E\left[\left(\sum_{i=1}^{N} X_i\right)^4\right] = \sum_{i=1}^{N} E\left[X_i^4\right] + 6\sum_{i=1}^{N-1}\sum_{j=i+1}^{N} E\left[X_i^2 X_j^2\right] + \\ 4\sum_{i=1}^{N}\sum_{\substack{j=1 \\ j \ne i}}^{N} E\left[X_i^3 X_j\right] + 12\sum_{i=1}^{N}\sum_{\substack{j=1 \\ j \ne i}}^{N}\sum_{\substack{k>j \\ k \ne i}}^{N} E\left[X_i^2 X_j X_k\right] + \\ +24\sum_{i<j<k<l} E[X_i X_j X_k X_l] = N\mu_4^{(i)} + 3N(N-1)\mu_2^{(i)}\mu_2^{(i)} + \\ 4N(N-1)\mu_3^{(i)}\mu_1^{(i)} + 6N(N-1)(N-2)\mu_2^{(i)}\mu_1^{(i)}\mu_1^{(i)} + \\ N(N-1)(N-2)(N-3)\mu_1^{(i)}\mu_1^{(i)}\mu_1^{(i)}\mu_1^{(i)} \\ N = 3, \\ \mu_4 = 3\mu_4^{(i)} + 6\sum_{i=1}^{2}\sum_{j=i+1}^{3} E\left[X_i^2 X_j^2\right] + 4\sum_{i=1}^{3}\sum_{j=1}^{3} E\left[X_i^3 X_j\right] + \\ +12\left(E\left[X_1^2 X_2 X_3\right] + E\left[X_2^2 X_1 X_3\right] + E\left[X_3^2 X_1 X_2\right]\right) = \\ 3\mu_4^{(i)} + 24\mu_1^{(i)}\mu_3^{(i)} + 18\mu_2^{(i)}\mu_2^{(i)} + 36\mu_2^{(i)}\mu_1^{(i)}\mu_1^{(i)} \\ N = 2, \\ \mu_4 = 2\mu_4^{(i)} + 4\left(E[X_1]E\left[X_2^3\right] + E[X_2]E\left[X_1^3\right]\right) + 6E\left[X_1^2\right]E\left[X_2^2\right] = \\ 2\mu_4^{(i)} + 8\mu_1^{(i)}\mu_3^{(i)} + 6\mu_2^{(i)}\mu_2^{(i)} \\ N = 1, \\ \mu_4 = \mu_4^{(i)} \end{cases}; \tag{33}$$

to obtain $a_1$, $a_2$, $a_3$, $a_4$, first four moments of $\mu_l$ are calculated, and $\mu_l^{(i)}$ ($1 \le l \le 4$) of a variable $A_u$ is first calculated:

$$\mu_1^{(i)} i = E[X_i] = E[X_{i1} X_{i2}] = E\left[|h_{si}|\left|g_{id_k}\right|\right] = E[|h_{si}|]E\left[\left|g_{id_k}\right|\right] \tag{34}$$

$$\mu_2^{(i)} = E\left[X_i^2\right] = E\left[X_{i1}^2 X_{i2}^2\right] = E\left[|h_{si}|^2\left|g_{id_k}\right|^2\right] = E\left[|h_{si}|^2\right]E\left[\left|g_{id_k}\right|^2\right] \tag{35}$$

$$\mu_3^{(i)} = E\left[X_i^3\right] = E\left[X_{i1}^3 X_{i2}^3\right] = E\left[|h_{si}|^3\left|g_{id_k}\right|^3\right] = E\left[|h_{si}|^3\right]E\left[\left|g_{id_k}\right|^3\right] \tag{36}$$

$$\mu_4^{(i)} = E\left[X_i^4\right] = E\left[X_{i1}^4 X_{i2}^4\right] = E\left[|h_{si}|^4\left|g_{id_k}\right|^4\right] = E\left[|h_{si}|^4\right]E\left[\left|g_{id_k}\right|^4\right]. \tag{37}$$

5. The method of claim 4, wherein the $\mu_l^{(i)}$ ($1 \le l \le 4$) of a variable $A_u$ is calculated as follows:

firstly, calculating the expectations of $X_{i1}$ and $X_{i2}$, and calculating the expectation of $f_{X_n}(x)$ as follows:

$$\begin{aligned} E[|h_{si}|] = E\left[\left|g_{id_k}\right|\right] &= \int_0^{\infty} x f_{X_{i1}}(x)\,dx \\ &= \int_0^{\infty} x \frac{2\alpha^{\alpha} x^{2\alpha-1}}{R^{2\alpha}\Gamma(\alpha)} \exp\left(\frac{-x^2}{R^2}\alpha\right)dx \end{aligned} \tag{38}$$

-continued $$= \frac{\alpha^{\alpha}\left(\frac{\alpha}{R^2}\right)^{-0.5-\alpha} R^{-2\alpha}\Gamma(0.5+\alpha)}{\Gamma(\alpha)}$$

substituting formula (38) into formula (34), to yield:

$$\mu_1^{(i)} = \left(\frac{\alpha^{\alpha}\left(\frac{\alpha}{R^2}\right)^{-0.5-\alpha} R^{-2\alpha}\Gamma(0.5+\alpha)}{\Gamma(\alpha)}\right)^2 \tag{39}$$

parsing processes of $\mu_2^{(i)}$, $\mu_3^{(i)}$, $\mu_4^{(i)}$ are the same as that of $\mu_1^{(i)}$:

$$\mu_2^{(i)} = \left(\alpha^{\alpha}\left(\frac{\alpha}{R^2}\right)^{-\alpha} R^{2-2\alpha}\right)^2 \tag{40}$$

$$\mu_3^{(i)} = \left(\frac{\alpha^{\alpha}\left(\frac{\alpha}{R^2}\right)^{-1.5-\alpha} R^{-2\alpha}\Gamma(1.5+\alpha)}{\Gamma(\alpha)}\right)^2 \tag{41}$$

$$\mu_4^{(i)} = \left(\frac{\alpha^{\alpha}(1+\alpha)\left(\frac{\alpha}{R^2}\right)^{-2-\alpha} R^{-2\alpha}\Gamma(1+\alpha)}{\Gamma(\alpha)}\right)^2 \tag{42}$$

to obtain the outage probability of the legitimate NOMA user and the intercept probability when the eavesdropper intercepts the information $x_n$ and $x_m$:

$$P_{out,n} = F_{A_n}\left(\sqrt{\frac{d_B^{\tau} d_{R,n}^{\tau}(2^{2R_n}-1)}{\rho_S(\alpha_n - x\rho_{SD_n}^2)}}\right) = a_1 a_2 G_{2,3}^{2,1}\left(\frac{\sqrt{\frac{d_B^{\tau} d_{R,n}^{\tau}(2^{2R_n}-1)}{\rho_S(\alpha_n-(2^{2R_n}-1)\rho_{SD_n}^2)}}}{a_2}\,\middle|\, \begin{matrix}1;\, a_3+1\\ a_4+1;\, a_5+1;\, 0\end{matrix}\right) \tag{43}$$

-continued $$P_{out,m} = F_{A_m}\left(\sqrt{\frac{d_B^{\tau} d_{R,m}^{\tau} x}{\rho_S(\alpha_m - x(\alpha_n+\rho_{SD_m}^2))}}\right) = a_1 a_2 G_{2,3}^{2,1}\left(\frac{\sqrt{\frac{d_B^{\tau} d_{R,m}^{\tau}(2^{2R_m}-1)}{\rho_S(\alpha_m-(2^{2R_m}-1)(\alpha_n+\rho_{SD_m}^2))}}}{a_2}\,\middle|\, \begin{matrix}1;\, a_3+1\\ a_4+1;\, a_5+1;\, 0\end{matrix}\right) \tag{44}$$

$$\begin{aligned} P_{int,n} &= 1 - P_r(C_{E_n} \le R_n) \\ &= 1 - F_{\gamma_{E_n}}(2^{2R_n}-1) \\ &= 1 - F_{A_e}\left(\sqrt{\frac{d_B^{\tau} d_{R,e}^{\tau}(2^{2R_n}-1)}{\rho_E(\alpha_n-(2^{2R_n}-1)\rho_{SE}^2)}}\right) \\ &= 1 - a_1 a_2 G_{2,3}^{2,1}\left(\frac{\sqrt{\frac{d_B^{\tau} d_{R,e}^{\tau}(2^{2R_n}-1)}{\rho_E(\alpha_n-(2^{2R_n}-1)\rho_{SE}^2)}}}{a_2}\,\middle|\, \begin{matrix}1;\, a_3+1\\ a_4+1;\, a_5+1;\, 0\end{matrix}\right) \end{aligned} \tag{45}$$

$$\begin{aligned} P_{int,m} &= 1 - P_r(C_{E_m} \le R_m) \\ &= 1 - F_{\gamma_{E_m}}(2^{2R_m}-1) \\ &= 1 - F_{A_e}\left(\sqrt{\frac{d_B^{\tau} d_{R,e}^{\tau}(2^{2R_m}-1)}{\rho_E(\alpha_m-(2^{2R_m}-1)(\alpha_n+\rho_{SE}^2))}}\right) \\ &= 1 - a_1 a_2 G_{2,3}^{2,1}\left(\frac{\sqrt{\frac{d_B^{\tau} d_{R,e}^{\tau}(2^{2R_m}-1)}{\rho_E(\alpha_m-(2^{2R_m}-1)(\alpha_n+\rho_{SE}^2))}}}{a_2}\,\middle|\, \begin{matrix}1;\, a_3+1\\ a_4+1;\, a_5+1;\, 0\end{matrix}\right); \end{aligned} \tag{46}$$

thus completing secure transmission of the physical layer of the system.

* * * * *